(12) United States Patent
Tsumura

(10) Patent No.: US 10,677,143 B2
(45) Date of Patent: Jun. 9, 2020

(54) CONTROL DEVICE FOR COMPRESSION SELF-IGNITION ENGINE

(71) Applicant: Mazda Motor Corporation, Aki-gun, Hiroshima (JP)

(72) Inventor: Yuichiro Tsumura, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 45 days.

(21) Appl. No.: 16/086,295

(22) PCT Filed: Nov. 20, 2017

(86) PCT No.: PCT/JP2017/041692
§ 371 (c)(1),
(2) Date: Sep. 18, 2018

(87) PCT Pub. No.: WO2018/097104
PCT Pub. Date: May 31, 2018

(65) Prior Publication Data
US 2019/0107040 A1 Apr. 11, 2019

(30) Foreign Application Priority Data

Nov. 22, 2016 (JP) .............................. 2016-227200
Nov. 22, 2016 (JP) .............................. 2016-227201

(51) Int. Cl.
*F02B 3/02* (2006.01)
*F02D 41/00* (2006.01)
(Continued)

(52) U.S. Cl.
CPC ............... *F02B 3/02* (2013.01); *F02B 23/10* (2013.01); *F02D 35/026* (2013.01); *F02D 37/02* (2013.01);
(Continued)

(58) Field of Classification Search
CPC .... F02D 35/023; F02D 35/024; F02D 35/025; F02D 35/026; F02D 41/006;
(Continued)

(56) References Cited

U.S. PATENT DOCUMENTS 6,293,246 B1 * 9/2001 Tanahashi ................. F01L 1/34
123/305
6,530,361 B1 * 3/2003 Shiraishi ................... F02B 1/12
123/305

(Continued)

FOREIGN PATENT DOCUMENTS

EP 1164277 A2 12/2001
JP 2001073775 A 3/2001
(Continued)

OTHER PUBLICATIONS

Manofsky, L., "Bridging the Gap between HCCI and SI: Spark-Assisted Compression Ignition" SAE International, Apr. 12, 2011, 18 pages.
(Continued)

*Primary Examiner* — John M Zaleskas
(74) *Attorney, Agent, or Firm* — Alleman Hall Creasman & Tuttle LLP

(57) ABSTRACT

A compression self-ignition engine performs a SI combustion in which an air-fuel mixture is combusted due to flame propagation triggered by spark ignition, and a CI combustion in which the air-fuel mixture is combusted due to self-ignition induced by the flame propagation. An ECU comprises a first control means for controlling a SI ratio serving as an index relating to a ratio of a heat amount generated in the SI combustion with respect to a total heat amount generated in the SI and CI combustions or a heat amount generated in the CI combustion; and a second control means for controlling an in-cylinder temperature before the SI combustion. The ECU is configured to change
(Continued)

a combustion state of each of the SI and CI combustions by both the first and second control means according to the operating state of the engine.

16 Claims, 14 Drawing Sheets

(51) Int. Cl.
    *F02D 41/40*     (2006.01)
    *F02P 5/04*     (2006.01)
    *F02P 5/145*     (2006.01)
    *F02B 23/10*     (2006.01)
    *F02D 41/30*     (2006.01)
    *F02P 15/00*     (2006.01)
    *F02P 5/155*     (2006.01)
    *F02D 35/02*     (2006.01)
    *F02D 37/02*     (2006.01)
    *F02B 1/04*     (2006.01)
    *F02B 1/12*     (2006.01)
    *F02D 41/38*     (2006.01)

(52) U.S. Cl.
    CPC ....... *F02D 41/006* (2013.01); *F02D 41/0052* (2013.01); *F02D 41/0057* (2013.01); *F02D 41/0065* (2013.01); *F02D 41/3041* (2013.01); *F02D 41/401* (2013.01); *F02P 5/045* (2013.01); *F02P 5/145* (2013.01); *F02P 5/155* (2013.01); *F02P 15/00* (2013.01); *F02B 1/04* (2013.01); *F02B 1/12* (2013.01); *F02D 35/023* (2013.01); *F02D 41/402* (2013.01); *F02D 2041/389* (2013.01); *F02D 2200/10* (2013.01); *Y02T 10/125* (2013.01)

(58) Field of Classification Search
    CPC ............. F02D 41/0065; F02D 41/3029; F02D 41/3035; F02D 41/3041; F02D 41/3047; F02D 41/3064; F02B 1/12
    See application file for complete search history.

(56) References Cited

U.S. PATENT DOCUMENTS

| | | | | |
|---|---|---|---|---|
| 10,487,720 | B2* | 11/2019 | Inoue | F02B 23/0669 |
| 2001/0045200 | A1* | 11/2001 | Urushihara | F02B 1/12 |
| | | | | 123/295 |
| 2001/0052335 | A1* | 12/2001 | Miyakubo | F02B 1/04 |
| | | | | 123/305 |
| 2002/0046741 | A1* | 4/2002 | Kakuho | F02D 13/0219 |
| | | | | 123/568.14 |
| 2002/0059914 | A1* | 5/2002 | Yamaguchi | F02D 37/02 |
| | | | | 123/299 |
| 2002/0073957 | A1* | 6/2002 | Urushihara | F02D 35/023 |
| | | | | 123/299 |
| 2005/0016496 | A1* | 1/2005 | Hitomi | F01L 1/053 |
| | | | | 123/305 |
| 2005/0229908 | A1* | 10/2005 | Kuzuyama | F02D 35/025 |
| | | | | 123/552 |
| 2006/0243241 | A1* | 11/2006 | Kuo | F02D 13/0203 |
| | | | | 123/295 |
| 2007/0062483 | A1* | 3/2007 | Yang | F02D 35/025 |
| | | | | 123/295 |
| 2007/0089697 | A1* | 4/2007 | Hara | F02D 35/023 |
| | | | | 123/90.15 |
| 2008/0162021 | A1 | 7/2008 | Itoga et al. | |
| 2008/0167786 | A1* | 7/2008 | Sasaki | F02D 35/023 |
| | | | | 701/102 |
| 2009/0259387 | A1* | 10/2009 | Kakuya | F02D 13/0265 |
| | | | | 701/103 |
| 2009/0292447 | A1* | 11/2009 | Yamaguchi | F02D 35/023 |
| | | | | 701/103 |
| 2010/0242900 | A1* | 9/2010 | Hitomi | F02D 13/0238 |
| | | | | 123/299 |
| 2011/0077846 | A1* | 3/2011 | Zavala Jurado | F02D 35/023 |
| | | | | 701/111 |
| 2011/0180035 | A1* | 7/2011 | Durrett | F02B 17/005 |
| | | | | 123/295 |
| 2011/0180038 | A1* | 7/2011 | Yamakawa | F02D 13/0211 |
| | | | | 123/435 |
| 2013/0024097 | A1* | 1/2013 | Nada | F02D 41/3035 |
| | | | | 701/104 |
| 2013/0184967 | A1* | 7/2013 | Kang | F02D 41/14 |
| | | | | 701/102 |
| 2014/0299107 | A1* | 10/2014 | Iwai | F02D 41/006 |
| | | | | 123/478 |
| 2015/0114340 | A1* | 4/2015 | Saito | F02D 37/00 |
| | | | | 123/294 |
| 2015/0136070 | A1* | 5/2015 | Matsushima | F02P 5/045 |
| | | | | 123/294 |
| 2015/0226143 | A1* | 8/2015 | Iwai | F02D 13/0207 |
| | | | | 123/294 |
| 2016/0245128 | A1* | 8/2016 | Shintani | F01L 1/34 |
| 2017/0211499 | A1* | 7/2017 | Ochi | F02D 13/0219 |
| 2017/0234249 | A1* | 8/2017 | Sakai | F02D 41/0025 |
| | | | | 123/295 |
| 2017/0292462 | A1* | 10/2017 | Tsuda | F02B 11/00 |
| 2018/0017011 | A1* | 1/2018 | Kumagae | F02D 35/025 |
| 2018/0066600 | A1* | 3/2018 | Harada | F02D 35/025 |
| 2018/0334998 | A1* | 11/2018 | Inoue | F02D 13/0261 |

FOREIGN PATENT DOCUMENTS

| | | | |
|---|---|---|---|
| JP | 2003049691 A | | 2/2003 |
| JP | 2003090239 A | | 3/2003 |
| JP | 2007154859 A | | 6/2007 |
| JP | 2009108777 A | | 5/2009 |
| JP | 2012246783 A | | 12/2012 |
| JP | 2015094334 A | | 5/2015 |

OTHER PUBLICATIONS

Olesky, L., "An Experimental Investigation of the Burn Rates of Naturally Aspirated Spark Assisted Compression Ignition Combustion in a Single Cylinder Engine with Negative Valve Overlap," Doctor of Philosophy Dissertation, The University of Michigan, 2013, 173 pages.

* cited by examiner

CONTROL DEVICE FOR COMPRESSION SELF-IGNITION ENGINE

TECHNICAL FIELD

The present invention relates to a control device for a compression self-ignition engine configured to cause an air-fuel mixture to be self-ignited in a combustion chamber.

BACKGROUND ART

A technique relating to the present invention is disclosed, for example, in the following Patent Document 1. In the Patent Document 1, there is disclosed a compression self-ignition engine configured to supply auxiliary energy to an air-fuel mixture in a combustion chamber to promote self-ignition, wherein a target in-cylinder temperature at top dead center of a compression stroke is set, and an in-cylinder temperature is controlled to attain the target in-cylinder temperature, by means of an intake air heating device provided in an intake passage

CITATION LIST

Patent Document

Patent Document 1: JP 2001-73775A

SUMMARY OF INVENTION

Technical Problem

Meanwhile, the inventors of this application studied a combustion mode which is a combination of a SI (Spark Ignition) combustion and a CI (Compression Ignition) combustion. More specifically, in this combustion mode, a SI combustion (equivalent to a first combustion) due to propagation of a flame created by forcibly igniting an air-fuel mixture in a combustion chamber is performed in combination with a CI combustion (which is equivalent to a second combustion) in which an unburned (uncombusted) part of the air-fuel mixture in the combustion chamber is combusted due to self-ignition induced by heat generation in the SI combustion. The SI combustion has a relatively small pressure fluctuation, so that it becomes possible to suppress the occurrence of combustion noise. On the other hand, the CI combustion has a shorter combustion period, as compared to the combustion caused by flame propagation. This is advantageous in improving fuel economy. Thus, the combustion mode as a combination of the SI combustion and the CI combustion is capable of improving fuel economy while suppressing the occurrence of combustion noise. This combustion mode will hereinafter be referred to as "SPCCI (Spark Controlled Compression Ignition) combustion", because, in the combustion mode, the CI combustion is controlled by the SI combustion.

Further, regarding the SPCCI combustion, the inventors of this application found that it is possible to satisfy both the need to suppress the occurrence of combustion noise and the need to improve fuel economy, over a wide operating range of an engine, by changing an "SI ratio" according to an operating state of the engine, wherein the SI ratio is defined as an index relating to the ratio of a heat amount generated in the SI combustion with respect to a total heat amount generated in the SI combustion and the CI combustion or a heat amount generated in the CI combustion, during each combustion cycle of the engine.

Here, from a viewpoint of suppressing combustion noise, it is desirable to adequately control the SI ratio. However, if the SI ratio is determined only from the viewpoint of suppressing combustion noise, it becomes difficult to control a self-ignition timing for the CI combustion. If the self-ignition timing for the CI combustion deviates from a desired timing, it leads to deterioration in fuel economy or deterioration in combustion stability.

The present invention has been made in view of solving the above conventional problem, and an object thereof is to provide a control device for a compression self-ignition engine configured to perform the SPCCI combustion, which is capable of adequately controlling both the SI ratio and the self-ignition timing.

Solution to Technical Problem

In order to achieve the above object, according to one aspect of the present invention, there is provided a control device for a compression self-ignition engine, including: an engine having a combustion chamber operable to combust an air-fuel mixture, an injector operable to inject fuel to supply the fuel into the combustion chamber, and a spark plug operable to ignite the air-fuel mixture in the combustion chamber, the engine configured to cause the air-fuel mixture in the combustion chamber to be self-ignited in association with the spark ignition of the spark plug; and a controller configured to control at least the injector and the spark plug to control an operation of the engine, wherein the engine performs a first combustion in which the air-fuel mixture is combusted due to a flame propagation triggered by a spark ignition of the spark plug, and a second combustion in which the air-fuel mixture is combusted due to a self-ignition induced by the flame propagation, wherein the controller comprises: a first control means for controlling a SI ratio serving as an index relating to a ratio of a heat amount generated in the first combustion with respect to a total heat amount generated in the first and second combustions or a heat amount generated in the second combustion, based on an operating state of the engine and during each combustion cycle of the engine; and a second control means for controlling an initial in-cylinder temperature which is an internal temperature of the combustion chamber before a start of the first combustion, based on the operating state of the engine and during each combustion cycle of the engine, and wherein the controller is configured to change combustion states of both the first and second combustions by using both the first and second control means according to the operating state of the engine, during each combustion cycle of the engine.

In the control device according to the first aspect of the present invention having the above feature, combustion states of both the first combustion caused by flame propagation and the second combustion caused by self-ignition are changed by both the first control means for controlling the SI ratio and the second control means for controlling the initial in-cylinder temperature before the start of the first combustion, according to the operating state of the engine. Thus, a combustion waveform of a combination of the first and second combustions can be set to a desired pattern. Specifically, it is possible to adequately attain a desired SI ratio and a desired self-ignition timing. This makes it possible to achieve improvement in fuel economy, ensuring of combustion stability, and suppression of combustion noise.

In the present invention, it is preferable that the second control means of the controller is configured to perform control of gradually lowering the initial in-cylinder temperature as an engine load serving as the operating state of the engine becomes higher.

According to this feature, the second control means operates to perform control of gradually lowering the initial in-cylinder temperature before the start of the first combustion, as an engine load becomes higher, so that it becomes possible to adequately increase the SI ratio along with an increase in engine load.

In the present invention, it is preferable that the first and second control means of the controller are configured to control the SI ratio and the initial in-cylinder temperature such that a combustion gravity center position in a combustion corresponding to a combination of the first and second combustions is maintained approximately constant, irrespective of an engine load serving as the operating state of the engine.

According to this feature, the combustion gravity center position in combustion as the combination of the first combustion and the second combustion is maintained approximately constant, so that it becomes possible to adequately ensure a required torque from a driver. For example, the combustion gravity center position may be maintained around top dead center of a compression stroke (a crank angle around top dead center of a compression stroke and after the top dead center of the compression stroke). In this case, it is possible to effectively improve fuel economy.

In the present invention, it is preferable that the control device further comprises a state quantity setting device configured to adjust an introduction of fresh air and burned gas into the combustion chamber of the engine so as to set an inside of the combustion chamber to a desired state, and the second control means of the controller controls the state quantity setting device such that a ratio between fresh air and burned gas to be introduced into the combustion chamber is adjusted so as to adjust the initial in-cylinder temperature.

According to this feature, the initial in-cylinder temperature can be adequately controlled by adjusting the ratio between fresh air and burned (combusted) gas to be introduced into the combustion chamber. In a typical example, the initial in-cylinder temperature can be raised by increasing a ratio of the burned gas to the fresh air.

In the present invention, it is preferable that the controller is configured to set a target SI ratio and a target initial in-cylinder temperature before the start of the first combustion each according to the operating state of the engine, and to perform control of adjusting the SI ratio and control of adjusting the initial in-cylinder temperature by both the first and second control means, so as to attain the target SI ratio and the target initial in-cylinder temperature.

According to this feature, the SI ratio and the initial in-cylinder temperature are adjusted to attain the target SI ratio and the target initial in-cylinder temperature, so that it becomes possible to adequately attain a desired combustion waveform of a combination of the first and second combustions.

In the present invention, it is preferable that the control device further comprises a state quantity setting device configured to adjust an introduction of fresh air and burned gas into the combustion chamber of the engine so as to thereby set an inside of the combustion chamber to a desired state, and the controller is configured to control the state quantity setting device such that a ratio between fresh air and burned gas to be introduced into the combustion chamber is adjusted so as to attain the target initial in-cylinder temperature, and to acquire an actual initial in-cylinder temperature before the start of the first combustion so as to control a spark ignition timing of the spark plug based on the acquired initial in-cylinder temperature, to thereby attain a self-ignition timing according to the target SI ratio and the target initial in-cylinder temperature.

According to this feature, after performing control of adjusting an in-cylinder state before the start of the first combustion, an actual initial in-cylinder temperature before the start of the first combustion is acquired, and the spark ignition timing is controlled based on the acquired initial in-cylinder temperature, so that it becomes possible to reliably attain the target SI ratio and the target initial in-cylinder temperature.

In the present invention, it is preferable that the second control means of the controller is configured to adjust, as the initial in-cylinder temperature before the start of the first combustion, an in-cylinder temperature at a timing when a piston of the engine is located at a bottom dead center position in an intake stroke.

According to another aspect of the present invention, there is provided a control device for a compression self-ignition engine, comprising: an engine having a combustion chamber operable to combust an air-fuel mixture, an injector operable to inject fuel to supply the fuel into the combustion chamber, and a spark plug operable to ignite the air-fuel mixture in the combustion chamber, the engine configured to cause the air-fuel mixture in the combustion chamber to be self-ignited in association with the spark ignition of the spark plug; and a controller configured to control at least the injector and the spark plug to control an operation of the engine, wherein the engine performs a first combustion in which the air-fuel mixture is combusted due to a flame propagation triggered by a spark ignition of the spark plug, and a second combustion in which the air-fuel mixture is combusted due to a self-ignition induced by the flame propagation, wherein the controller comprises: a first control means for controlling a SI ratio serving as an index relating to a ratio of a heat amount generated in the first combustion with respect to a total heat amount generated in the first and second combustions or a heat amount generated in the second combustion, based on an operating state of the engine and during each combustion cycle of the engine; and a second control means for controlling a self-ignition timing which is a timing at which the self-ignition occurs, based on the operating state of the engine and during each combustion cycle of the engine, wherein the controller configured to change combustion states of both the first and second combustions by using both the first and second control means according to the operating state of the engine, during each combustion cycle of the engine.

In the control device according to the second aspect of the present invention having the above feature, combustion states of both the first combustion caused by flame propagation and the second combustion caused by self-ignition are changed by both the first control means for controlling the SI ratio and the second control means for controlling the self-ignition timing for the second combustion, according to the operating state of the engine. Thus, a combustion waveform of a combination of the first and second combustions can be set to a desired pattern. Specifically, it is possible to adequately attain a desired SI ratio and a desired self-ignition timing. This makes it possible to achieve improvement in fuel economy, ensuring of combustion stability, and suppression of combustion noise.

In the present invention, it is preferable that the second control means of the controller is configured to perform control of gradually shifting the self-ignition timing toward a retard side, as an engine load serving as the operating state of the engine becomes higher.

When the engine load is relatively low, combustion noise is less likely to become a problem. Thus, according to the above feature, in such an operating state, the second control means operates to set the self-ignition timing to a relatively advance side so as to ensure self-ignition stability. On the other hand, when the engine load is relatively high, the second control means operates to shift the self-ignition timing toward the retard side to extend a time period during which the second combustion is performed, as long as possible, so as to ensure fuel economy.

In the present invention, it is preferable that the second control means of the controller is configured to shift the self-ignition timing toward the retard side to the extent that the self-ignition timing does not exceed a given retard limit.

According to this feature, retardation of the self-ignition timing is restricted by the retard limit, so that it becomes possible to ensure self-ignition stability in the second combustion.

In the present invention, it is preferable that the first and second control means of the controller are configured to control the SI ratio and the self-ignition timing such that a combustion gravity center position in a combustion corresponding to a combination of the first and second combustions is maintained approximately constant, irrespective of an engine load serving as the operating state of the engine.

According to this feature, the combustion gravity center position in combustion as the combination of the first combustion and the second combustion is maintained approximately constant, so that it becomes possible to adequately ensure a required torque from a driver. For example, the combustion gravity center position may be maintained around top dead center of a compression stroke (a crank angle around top dead center of a compression stroke and after the top dead center of the compression stroke). In this case, it is possible to effectively improve fuel economy.

In the present invention, it is preferable that the second control means of the controller is configured to control a spark ignition timing of the spark plug to adjust the self-ignition timing.

According to this feature, a start timing of the first combustion can be adjusted by the spark ignition timing of the spark plug, so as to adequately control the self-ignition timing for the subsequent second combustion.

In the present invention, it is preferable that the controller is configured to set a target SI ratio and a target self-ignition timing each according to the operating state of the engine, and to perform control of adjusting the SI ratio and the self-ignition timing by both the first and second control means, so as to attain the target SI ratio and the target self-ignition timing.

According to this feature, the SI ratio and the self-ignition timing are adjusted to attain the target SI ratio and the target self-ignition timing, so that it becomes possible to adequately attain a desired combustion waveform of a combination of the first and second combustions.

In the present invention, it is preferable that the control device further comprises a state quantity setting device configured to adjust an introduction of fresh air and burned gas into the combustion chamber of the engine so as to set an inside of the combustion chamber to a desired state, and the controller is configured to calculate a state of the inside of the initial combustion chamber before a start of the first combustion to be set according to the target SI ratio and the target self-ignition timing, and to control the state quantity setting device such that a ratio between fresh air and burned gas to be introduced into the combustion chamber is adjusted so as to attain the calculated state, and to acquire an actual state of the inside of the combustion chamber before the start of the first combustion so as to control the spark ignition timing of the spark plug based on the acquired state, to thereby attain the target self-ignition timing.

According to this feature, after performing control of adjusting an in-cylinder state before the start of the first combustion, an actual initial in-cylinder temperature before the start of the first combustion is acquired, and the spark ignition timing is controlled based on the acquired initial in-cylinder temperature, so that it becomes possible to reliably attain the target SI ratio and the target self-ignition timing.

In the present invention, it is preferable that the first control means of the controller is configured to perform control of gradually increasing the SI ratio, as an engine load serving as the operating state of the engine becomes higher.

According to this feature, when the engine load is relatively low, the first control means operates to reduce the SI ratio, so that it becomes possible to shorten a combustion period to improve fuel economy. On the other hand, when the engine load is relatively high, the first control means operates to increase the SI ratio, so that it becomes possible to suppress combustion noise due to the second combustion.

In the present invention, it is preferable that the first control means of the controller is configured to control a spark ignition timing of the spark plug to adjust the SI ratio.

According to this feature, the SI ratio be adequately controlled by adjusting the spark ignition timing of the spark plug at which the first combustion is started. In a typical example, the SI ratio can be increased by advancing increasing the spark ignition timing, and can be reduced by retarding the spark ignition timing.

In the present invention, it is preferable that the control device further comprises a state quantity setting device configured to adjust an introduction of fresh air and burned gas into the combustion chamber of the engine so as to set an inside of the combustion chamber to a desired state, and wherein the first control means of the controller is configured to control the state quantity setting device such that a ratio between fresh air and burned gas to be introduced into the combustion chamber is adjusted so as to adjust the SI ratio.

According to this feature, the SI ratio can be adequately controlled by adjusting the ratio between fresh air and burned gas to be introduced into the combustion chamber, to control an in-cylinder state (e.g. initial in-cylinder temperature). For example, the SI ratio can be adequately controlled by adjusting the ratio between the fresh air and the burned gas, such that the initial in-cylinder temperature before the start of the first combustion is raised to delay the start of the first combustion.

In the present invention, it is preferable that the controller is configured to control the injector to execute a late-stage injection for injecting fuel at a timing before and close to a spark ignition timing of the spark plug, and an early-stage injection for injecting fuel at a timing before the late-stage injection and apart from the spark ignition timing, so as to form an approximately homogeneous air-fuel mixture in the combustion chamber, and the first control means is configured to control a fuel injection amount from the injector in the later-stage injection, so as to adjust the SI ratio.

Basically, when performing a split injection comprising the early-stage injection and the late-stage injection, fuel injected by the late-stage injection is subjected to the first combustion, and fuel injected by the early-stage is mainly subjected to the second combustion. Thus, according to the above feature, the SI ratio can be adequately controlled by adjusting a fuel injection amount from the injector in the late-stage injection.

Effect of Invention

The control device for a compression self-ignition engine configured to perform the SPCCI combustion, according to the present invention, is capable of adequately controlling both the SI ratio and the self-ignition timing.

DESCRIPTION OF EMBODIMENTS

With reference to the accompanying drawings, a compression self-ignition engine control device according to one embodiment of the present invention will now be described.
<Device Configuration>

First of all, with reference to FIGS. 1 to 3, a configuration of the compression self-ignition engine control device according to this embodiment will be described.

Figure 1:
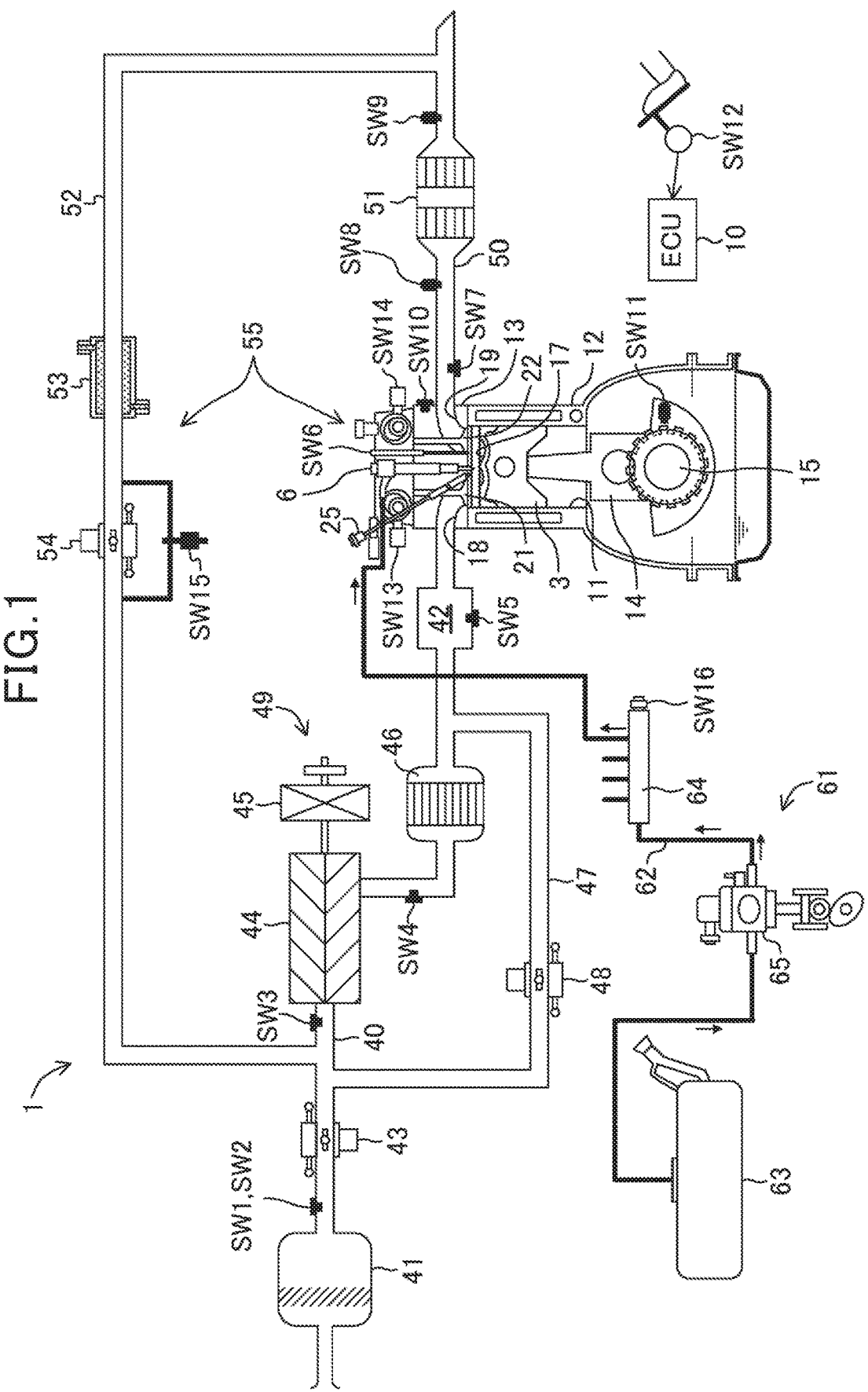
FIG. 1 is a schematic configuration diagram of a compression self-ignition engine according to one embodiment of the present invention.

FIG. 1 is a diagram exemplifying a configuration of a compression self-ignition engine according to this embodiment. FIG. 2 is a sectional view exemplifying a configuration of a combustion chamber in the compression self-ignition engine. In FIG. 1, an intake side is on the left side of the drawing sheet, and an exhaust side is on the right side of the drawing sheet. On the other hand, in FIG. 2, the intake side is on the right side of the drawing sheet, and the exhaust side is on the left side of the drawing sheet. FIG. 3 is a block diagram exemplifying a configuration of the control device according to this embodiment.

The engine 1 is mounted to a four-wheeled vehicle. The vehicle is driven by operating the engine 1. In this configuration example, fuel of the engine 1 is gasoline. The gasoline may contain bioethanol or the like. The fuel of the engine 1 may be any type of fuel, as long as it is liquid fuel containing at least gasoline.

Specifically, the engine 1 comprises a cylinder block 12, and a cylinder head 13. The cylinder block 12 is internally formed with a plurality of cylinders 11. In each of FIGS. 1 and 2, only one of the cylinders 11 is depicted. That is, the engine 1 is a multi-cylinder engine.

A piston 3 is slidably inserted in each of the cylinders 11. The piston 3 is coupled to a crankshaft 15 through a connecting rod 14. The piston 3 defines a combustion chamber 17 in cooperation with the cylinder 11 and the cylinder head 13. Here, the term "combustion chamber" does not limitedly mean a space defined when the piston 3 reaches a top dead center position in a compression stroke. The term "combustion chamber" may be used in a broad sense. That is, in some cases, the term "combustion chamber" means a space defined by the piston 3, the cylinder 11 and the cylinder head 13, irrespective of the position of the piston 3.

The piston 3 has a flat top surface. A top wall of the piston 3 is formed with a cavity 31. The cavity 31 is concavely depressed from the top surface of the piston 3. The cavity 31 has a flat dish-like shape. When the piston 3 is located at the top dead center position in the compression stroke, the cavity 31 is opposed to an aftermentioned injector 6.

The cavity 31 has a convex portion 311. The convex portion 311 is provided at approximately the center of the cylinder 11, in top plan view. The convex portion 311 has an approximately cone shape. The convex portion 311 extends obliquely upwardly from a bottom of the cavity 31 along a central axis X of the cylinder 11. A top edge of the convex portion 311 is at approximately the same height position as that of the top surface of the cavity 31. The cavity 31 further has a concavely depressed portion 312 provided around the convex portion 311.

A lower surface of the cylinder head 13, i.e., a ceiling surface of the combustion chamber 17, is composed of an inclined surface 1311 and an inclined surface 1312. The inclined surface 1311 has a rising slope in a direction from the intake side toward the axis X. The inclined surface 1311 has a rising slope in a direction from the exhaust side toward the axis X. That is, the ceiling surface of combustion chamber 17 has a so-called pent-roof shape.

Figure 2:
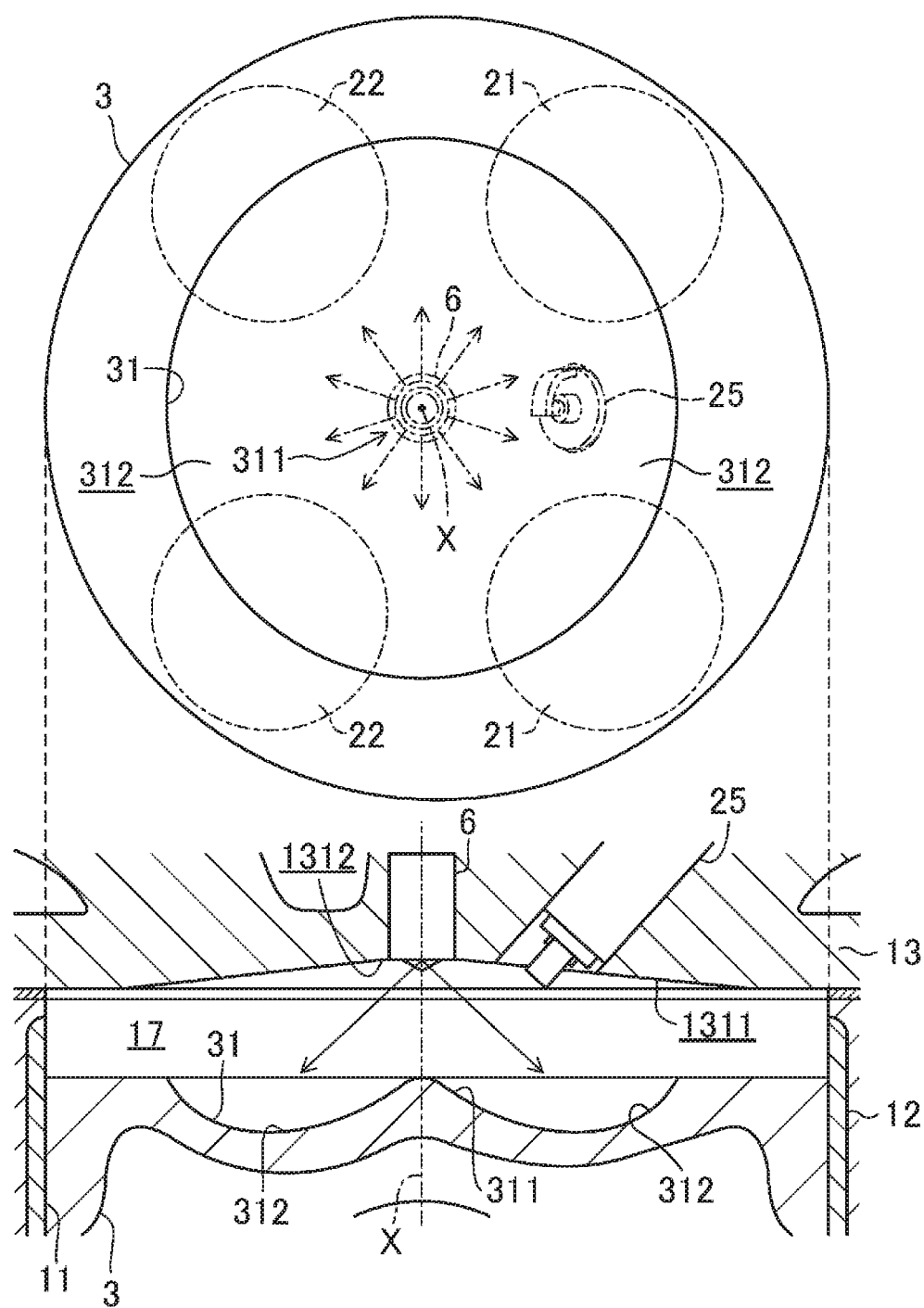
FIG. 2 is a sectional view of a combustion chamber of a compression self-ignition engine according to one embodiment of the present invention.

Here, it should be noted that the shape of the combustion chamber 17 is not limited to the shape exemplified in FIG. 2. For example, the shape of the cavity 31, the shape of the top surface of the piston 3, and the shape of the ceiling surface of the combustion chamber 17 may be appropriately changed.

With a view to improvement in theoretical thermal efficiency, and stability in an aftermentioned CI (Compression Ignition) combustion, a geometric compression ratio of the engine 1 is set to a relatively high value. Specifically, the geometric combustion ratio of the engine 1 is 14 or more. For example, the geometric combustion ratio may be set to 16. The geometric combustion ratio may be appropriately set in the range of 14 to 20.

With respect to each of the cylinders 11, the cylinder head 13 is formed with two intake ports 18. Each of the intake ports 18 is communicated with the combustion chamber 17. Each of the intake ports 18 is provided with an intake valve 21. The intake valve 21 is configured to selectively open and close the communication between the combustion chamber 17 and the intake port 18. The intake valve 21 is configured to be opened and closed at given timings by an intake valve driving mechanism. In this configuration example, the intake valve driving mechanism comprises an electric intake VVT (Variable Valve Timing) device 23 as a variable valve operating mechanism, as presented in FIG. 3. The electric intake VVT device 23 is configured to continuously change a rotational phase of an intake camshaft within a given angular range. According to the change in the rotational phase, a valve opening timing and a valve closing timing of the intake valve 21 is continuously changed. Here, it is to be understood that the intake valve driving mechanism may comprise a hydraulic intake VVT device, in place of the electric intake VVT device.

With respect to each of the cylinders 11, the cylinder head 13 is formed with two exhaust ports 19. Each of the exhaust ports 19 is communicated with the combustion chamber 17. Each of the exhaust ports 19 is provided with an exhaust valve 22. The exhaust valve 22 is configured to selectively open and close the communication between the combustion chamber 17 and the exhaust port 19. The exhaust valve 22 is configured to be opened and closed at given timings by an exhaust valve driving mechanism. In this configuration example, the exhaust valve driving mechanism comprises an electric exhaust VVT device 24 as a variable valve operating mechanism, as presented in FIG. 3. The electric exhaust VVT device 24 is configured to continuously change a rotational phase of an exhaust camshaft within a given angular range. According to the change in the rotational phase, a valve opening timing and a valve closing timing of the exhaust valve 21 is continuously changed. Here, it is to be understood that the exhaust valve driving mechanism may comprise a hydraulic intake VVT device, in place of the electric intake VVT device.

This engine 1 is configured such that the length of a valve overlap period between a valve-open period of the intake valve 21 and a valve-open period of the exhaust valve 22 is adjusted by the electric intake VVT device 23 and the electric exhaust VVT device 24, although the details of this adjustment will be discussed later. According to this adjustment, it becomes possible to scavenge burned gas remaining in the combustion chamber 17, or to confine hot burned gas in the combustion chamber 17 (i.e., introduce internal EGR (Exhaust Gas Recirculation) gas into the combustion chamber 17). In this configuration example, a combination of the electric intake VVT device 23 and the electric exhaust VVT device 24 forms an internal EGR system serving as one state quantity setting device. Here, it should be noted that the internal EGR system is not necessarily formed using a VVT device.

With respect to each of the cylinders 11, the cylinder head 13 is provided with an injector 6. The injector 6 is configured to inject fuel directly into the combustion chamber 17. The injector 6 is installed in a ridge region of the pent roof where the intake-side inclined surface 1311 and the exhaust-side inclined surface 1312 intersect each other. The injector 6 is installed such that an injection axis thereof extends along the central axis X of the cylinder 11, as depicted in FIG. 2. The injection axis of the injector 6 is approximately coincident with the position of the convex portion 311 of the cavity 31. The injector 6 is opposed to the cavity 31. Here, the injection axis of the injector 6 does not need to be coincident with the central axis X of the cylinder 11. In this case, however, it is preferable that the injection axis of the injector 6 is coincident with the position of the convex portion 311 of the cavity 31.

The injector 6 is composed of a multi-hole fuel injection valve having a plurality of nozzle holes, although its detailed depiction will be omitted. The injector 6 is configured to inject fuel such that the fuel spreads in a radial pattern from the center of the combustion chamber 17, as indicated by the arrowed lines in FIG. 2.

In some cases, the injector 6 is operable to inject fuel at a timing when the piston 3 is located around the top dead center position in the compression stroke, as will be discussed later. In this situation, upon fuel injection from the injector 6, the injected fuel spray flows downwardly along the convex portion 311 of the cavity 31 and concurrently flows and spreads radially outwardly in a radial pattern from the center of the combustion chamber 17 along a bottom surface and a peripheral surface of the concavely depressed portion 312, while being mixed with fresh air. Then, the resulting air-fuel mixture reaches an opening of the cavity 31, and flows from a radially outward region toward the center of the combustion chamber 17 along the intake-side inclined surface 1311 and the exhaust-side inclined surface 1312.

Here, it should be noted that the injector 6 is not limited to a multi-hole injector. As the injector 6, an injector having an outward lifting valve may be employed.

A fuel supply system 61 is connected to the injector 6. The fuel supply system 61 comprises a fuel tank 63 configured to store fuel therein, and a fuel supply passage 62 connecting the fuel tank 63 and the injector 6 together. A fuel pump 65 and a common rail 64 are inserted in the fuel supply passage 62. The fuel pump 65 is operable to pump fuel to the common rail 64. In this configuration example, the fuel pump 65 is a plunger pump configured to be driven by the crankshaft 15. The common rail 64 is configured to store therein the fuel pumped from the fuel pump 65 at a high fuel pressure. When the injector 6 is opened, the fuel stored in the common rail 64 is injected from the nozzle holes of the injector 6 into the combustion chamber 17. The fuel supply system 61 is configured to be capable of supplying fuel having a high pressure of 30 MPa or more, to the injector 6. A maximum fuel pressure in the fuel supply system 61 may be set to, e.g., about 120 MPa. The pressure of fuel to be supplied to the injector 6 may be changed according to an operating state of the engine 1. Here, it should be noted that the configuration of the fuel supply system 61 is not limited to the above configuration.

With respect to each of the cylinders 11, the cylinder head 13 is provided with a spark plug 25. The spark plug 25 is operable to forcibly ignite the air-fuel mixture in the combustion chamber 17. In this configuration example, the spark plug 25 is installed on the intake side with respect to the central axis X of the cylinder 11. The spark plug 25 is located between the two intake ports 18, in top plan view. The spark plug 25 is installed to the cylinder head 13 in a posture where it extends obliquely downwardly toward the center of the combustion chamber 17. As depicted in FIG. 2, an electrode of the spark plug 25 is located to face the inside of the combustion chamber 17, in the vicinity of the ceiling surface of the combustion chamber 17.

An intake passage 40 is connected to one lateral surface of the engine 1. The intake passage 40 is communicated with the intake ports 18 in the cylinders 11. The intake passage 40 is a passage through which intake gas (fresh air or external EGR-diluted air) to be introduced into the combustion chamber 17 flows. The intake passage 40 is provided with an air cleaner 41 for filtering fresh air, at an upstream end thereof. The intake passage 40 is also provided with a surge tank 42, at a position adjacent to a downstream end thereof. A portion of the intake passage 40 located downstream of the surge tank 42 is formed as a plurality of independent passages each branched with respect to a respective one of the cylinders 11, although its detailed depiction will be omitted. Each of the independent passages has a downstream end connected to the two intake ports 18 in a respective one of the cylinders 11.

The intake passage 40 is further provided with a throttle valve 43, at a position between the air cleaner 41 and the serge tank 42. The throttle calve 43 is configured such that an opening degree thereof is adjusted to adjust the amount of fresh air to be introduced into the combustion chamber 17. The throttle valve 43 serves as one state quantity setting device.

The intake passage 40 is further provided with a supercharger 44, at a position downstream of the throttle valve 43. The supercharger 44 is configured to supercharge intake gas to be introduced into the combustion chamber 17. In this configuration example, the supercharger 44 is a mechanical supercharger configured to be driven by the engine 1. For example, the mechanical supercharger 44 may be a Roots type supercharger. The mechanical supercharger 44 may have any other configuration. Specifically, the mechanical supercharger 44 may be a Lysholm-type supercharger or a centrifugal-type supercharger.

An electromagnetic clutch 45 is interposed between the supercharger 44 and the engine 1. The electromagnetic clutch 45 is operable to selectively enable and disable transmission of driving force from the engine 1 to the supercharger 44. The ECU 10 is operable to switch between connection and disconnection of the electromagnetic clutch 45 to thereby switch between activation and deactivation of the supercharger 44, as will be discussed later. That is, the engine 1 is configured to be capable of switching between a supercharging state in which the supercharger 44 supercharges intake gas to be introduced into the combustion chamber 17, and a non-supercharging state in which the supercharger 44 does not supercharge intake gas to be introduced into the combustion chamber 17.

The intake passage 40 is further provided with an intercooler 46, at a position downstream of the supercharger 44. The intercooler 46 is configured to cool the intake gas compressed by the supercharger 44. For example, the intercooler 46 may be configured as a water-cooled intercooler.

A bypass passage 47 is connected to the intake passage 40. The bypass passage 47 connects a region of the intake passage 40 located upstream of the supercharger 44 and a region of the intake passage 40 located downstream of the intercooler 46 together so as to bypass the supercharger 44 and the intercooler 46. The bypass passage 47 is provided with an air bypass valve 48. The air bypass valve 48 is operable to adjust the flow ratio of intake gas flowing through the bypass passage 47.

When the supercharger 44 is deactivated (i.e., when the electromagnetic clutch 45 is disconnected), the air bypass valve 48 is fully opened. Thus, intake gas flowing through the intake passage 40 is introduced into the combustion chamber 17 of the engine 1, while bypassing the supercharger 44. Therefore, the engine 1 is operated in a non-supercharged, i.e., naturally-aspirated, state.

When the supercharger 44 is activated (i.e., when the electromagnetic clutch 45 is connected), intake gas having passed through the supercharger 44 partly flows back toward an upstream side of the supercharger via the bypass passage 47. An opening degree of the air bypass valve 48 can be adjusted so as to adjust the amount of the back-flow, and thus adjust a supercharging pressure for intake gas to be introduced into the combustion chamber 17. In this configuration example, a supercharging system 49 is composed of the supercharger 44, the bypass passage 47, and the air bypass valve 48. The air bypass valve 48 serves as one state quantity setting device.

An exhaust passage 50 is connected to the other lateral surface of the engine 1. The exhaust passage 50 is communicated with the exhaust ports 19 in the cylinders 11. The exhaust passage 50 is a passage through which exhaust gas discharged from the combustion chamber 17 flows. An upstream portion of the exhaust passage 50 is formed as a plurality of independent passages each branched with respect to a respective one of the cylinders 11, although its detailed depiction will be omitted. Each of the independent passages has an upstream end connected to the two exhaust ports 19 in a respective one of the cylinders 11. The exhaust passage 50 is provided with an exhaust gas purifying system having at least one catalyst converter 51. The catalyst converter is constructed such that it contains a three-way catalyst. Here, it should be noted that the exhaust gas purifying system is not limited to a type containing only a three-way catalyst.

An EGR passage 52 is connected between the intake passage 40 and the exhaust passage 50 to form an external EGR system. The EGR passage 52 is a passage for enabling burned gas to be partly recirculated to the intake passage 40 therethrough. The EGR passage 52 has an upstream end connected to a region of the exhaust passage 50 located downstream of the catalyst converter 51. Further, the EGR passage 52 has a downstream end connected to a region of the intake passage 40 located upstream of the supercharger 44.

The EGR passage 52 is provided with a water-cooled EGR cooler 53. The EGR cooler 53 is configured to cool burned gas in the EGR passage 52. The EGR passage 52 is further provided with an EGR valve 54. The EGR valve 54 is configured to adjust the flow ratio of burned gas flowing through the EGR passage 52. An opening degree of the EGR valve 54 can be adjusted so as to adjust a recirculation amount of cooled burned gas, i.e., external EGR gas.

In this configuration amount, an EGR system 55 is composed of the external EGR system constructed such that it comprises the EGR passage 52 and the EGR valve 54, and the internal EGR system constructed such that it comprises the electric intake VVT device 23 and the electric exhaust VVT device 24. The EGR valve 54 serves as one state quantity setting device.

The compression self-ignition engine control device comprises an ECU (Engine Control Unit) 10 for controlling operation of the engine 1. The ECU 10 is a controller based on a well-known microcomputer, and comprises a CPU (Central Processing Unit) 60 for executing a program, a memory composed of, e.g., a RAM (Random Access Memory) and a ROM (Read Only Memory) and capable of storing therein a program and data, and an input-output bus for inputting and outputting electric signals. The ECU 10 corresponds to one example of a controller.

Figure 3:
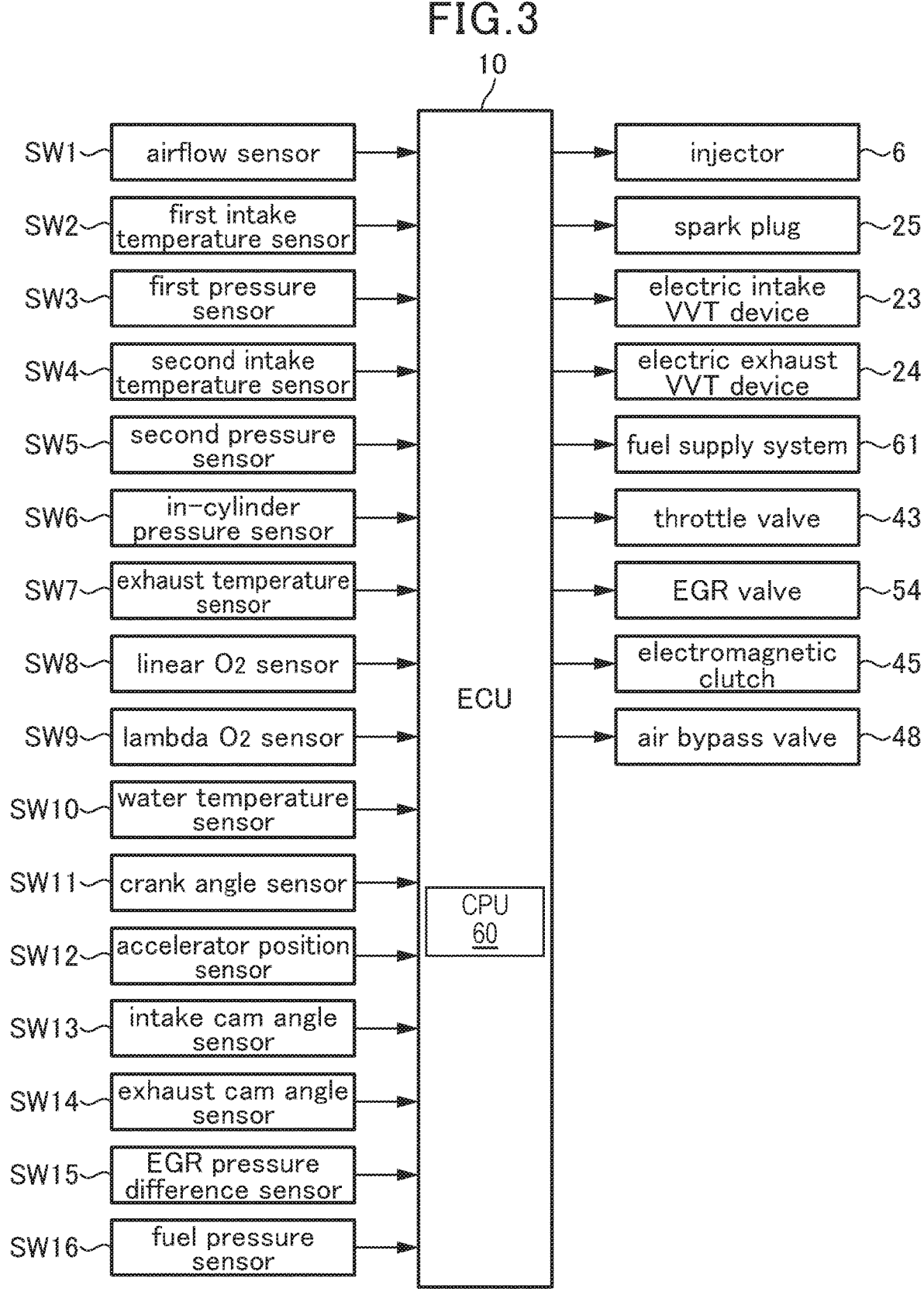
FIG. 3 is a block diagram depicting an electrical configuration of a compression self-ignition engine according to this embodiment.

As depicted in FIGS. 1 to 3, various sensors SW1 to SW16 are connected to the ECU 10. The sensors SW1 to SW16 are operable to output their detections signals to the ECU 10. The sensors are specifically as follows.

The sensors SW1 and SW2 are, respectively, an airflow sensor and a first intake temperature sensor each installed to the intake passage 40 at a position downstream of the air cleaner 41, wherein the airflow sensor SW1 is operable to detect the flow ratio of fresh air flowing through the intake passage 40, and the first intake temperature sensor SW2 is operable to detect the temperature of the fresh air; the switch SW3 being a first pressure sensor installed to the intake passage 40 at a position downstream of the connection point with the EGR passage 52 and upstream of the supercharger 44, and operable to detect the pressure of intake gas flowing into the supercharger 44; the sensor SW4 being a second intake temperature sensor installed to the intake passage 40 at a position downstream of the supercharger 44 and upstream of the connection point with the bypass passage 47, and operable to detect the temperature of intake gas flowing out of the supercharger 44; the sensor SW5 being a second pressure sensor installed to the surge tank 42 and operable to detect the pressure of intake gas on a downstream side of the supercharger 44; the switch SW6 being a pressure indicating sensor (in-cylinder pressure sensor) installed to the cylinder head 13 correspondingly to each of the cylinders 11, and operable to detect an internal temperature of the combustion chamber 17 (in-cylinder pressure) in each of the cylinders 11; the switch SW7 being an exhaust temperature sensor installed to the exhaust passage 50 and operable to detect the temperature of exhaust gas discharged from the combustion chamber 17; the switch SW8 being a linear $O_2$ sensor installed to the exhaust passage 50 at a position upstream of the catalyst converter 51, and operable to detect an oxygen concentration in exhaust gas; the switch SW9 being a lambda $O_2$ sensor installed to the exhaust passage 50 at a position downstream of the catalyst converter 51, and operable to detect an oxygen concentration in exhaust gas; the switches SW10 and SW11 being, respectively, a water temperature sensor and a crank angle sensor each installed to the engine 1, wherein the water temperature sensor SW10 is operable to detect the temperature of cooling water, and the crank angle sensor SW11 is operable to detect a rotation angle of the crankshaft 15; the switch SW12 being an accelerator position sensor installed to an accelerator pedal mechanism and operable to detect the position of an accelerator pedal corresponding to the amount of manipulation of the accelerator pedal; the switch SW13 being an intake cam angle sensor installed to the engine 1 and operable to detect a rotation angle of the intake camshaft; the switch SW14 being an exhaust cam angle sensor installed to the engine 1 and operable to detect a rotation angle of the exhaust camshaft; the switch SW15 being an EGR pressure difference sensor installed to the EGR passage 52 and operable to detect a pressure difference upstream and downstream of the EGR valve 54; and the switch SW16 being a fuel pressure sensor installed to the common rail 64 of the fuel supply system 61, and operable to detect the pressure of fuel to be supplied to the injector 6.

The ECU 10 is operable, based on detection signals of the above sensors, to determine the operating state of the engine 1, and calculate a control amount for each of a plurality of control target devices. Then, the ECU 10 is operable to output control signals indicative of the calculated control amounts, respectively, to the injector 6, the spark plug 25, the electric intake VVT device 23, the electric exhaust VVT device 24, the fuel supply system 61, the throttle valve 43, the EGR valve 54, the electromagnetic clutch 45 of the supercharger 44, and the air bypass valve 48. For example, the ECU 10 is operable, based on a pressure difference before and after the supercharger 44, obtained from the detection signals of the first pressure sensor SW3 and the second pressure sensor SW5, to adjust the opening degree of the air bypass valve 48 to thereby adjust the supercharging pressure. The ECU 10 is also operable, based on a pressure difference before and after the EGR valve 54, obtained from the detection signal of the EGR pressure difference sensor, to adjust the opening degree of the EGR valve 54 to thereby adjust the amount of external EGR gas to be introduced into the combustion chamber 17. The details of the control of the engine 1 by the ECU 10 will be discussed later.

<Operating Range of Engine>

Figure 4:
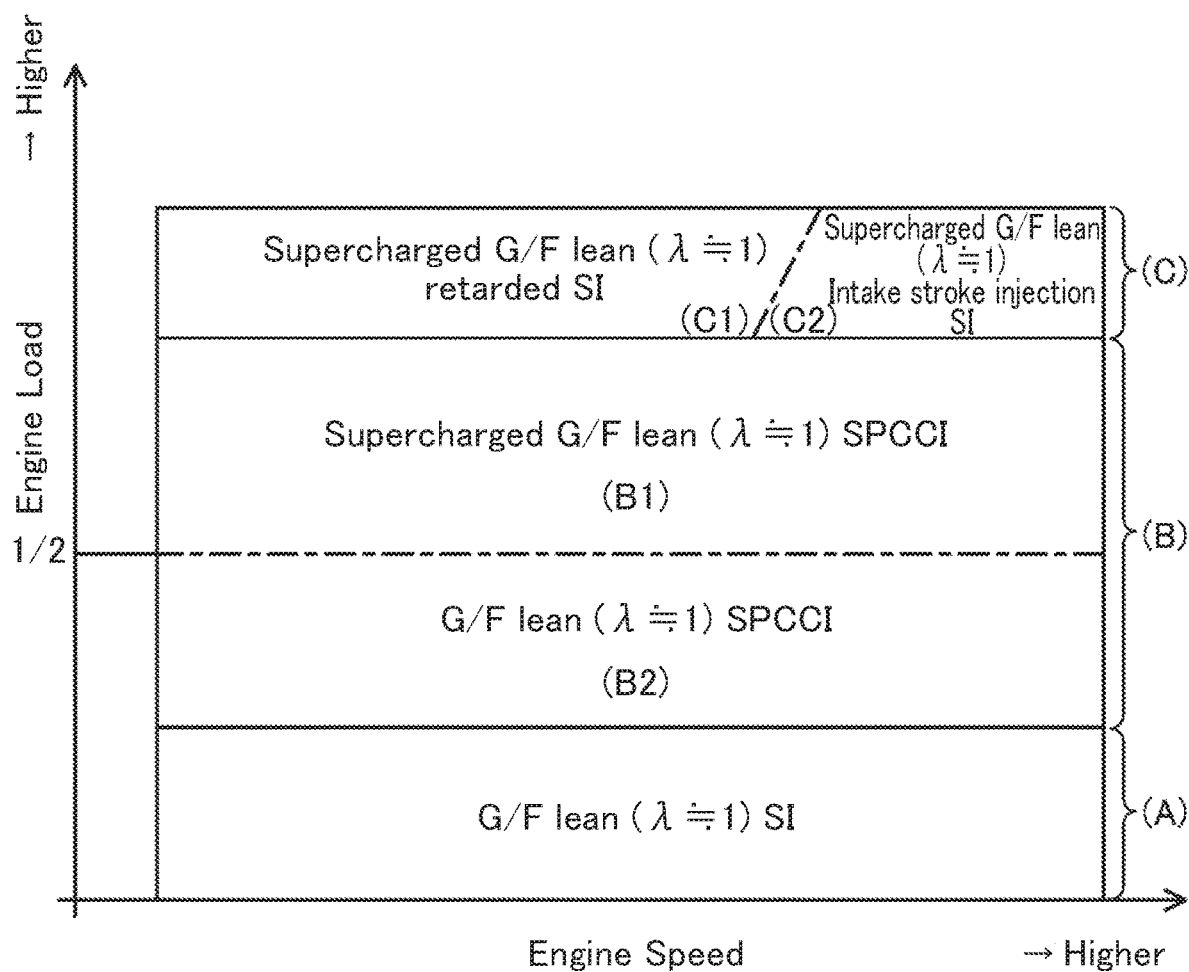
FIG. 4 is an explanatory diagram about an operating range of an engine according to this embodiment.

FIG. 4 exemplifies an operating range of the engine 1. The operating range of the engine 1 is roughly divided into three regions by the magnitude of engine load. Specifically, the three regions consist of: a low engine load region (A) including an idling operation; a high engine load region (C) includes a full load operation, and an intermediate engine load region (B) between the low engine load region (A) and the high engine load region (C). The engine 1 is configured to perform combustion caused by compression self-ignition, in the intermediate engine load region, mainly for the purpose of improvements in fuel economy and exhaust emission performance. Respective combustion modes in the low engine load region, the intermediate engine load region and the high engine load region will be described below in order.

(Low Engine Load Region)

When the operating state of the engine 1 is in the low engine load region, a fuel injection amount is relatively small. Therefore, the amount of heat generated when an air-fuel mixture is combusted in the combustion chamber 17 is relatively small, and thus the internal temperature of the combustion chamber 17 (in-cylinder temperature) is relatively low. Further, the temperature of exhaust gas is relatively low, so that, even when the internal EGR gas is introduced into the combustion chamber 17 as will be discussed later, the in-cylinder temperature is not raised enough to stably enable the occurrence of self-ignition. A combustion mode to be performed when the operating state of the engine 1 is in the low engine load region is a SI (Spark Ignition) combustion in which the air-fuel mixture in the combustion chamber 17 is spark-ignited by the spark plug 35 and combusted due to propagation of a resulting flame. This combustion mode in the low engine load region will hereinafter be referred to as occasionally as "low engine load SI combustion".

When the operating state of the engine 1 is in the low engine load region, an air/fuel ratio (A/F) of the air-fuel mixture is a theoretical air/fuel ratio (A/F=14.7). In this situation, the three-way catalyst purifies exhaust gas discharged from the combustion chamber 17 to provide good exhaust emission performance of the engine 1. The A/F of the air-fuel mixture may be set to fall within a purification window of the three-way catalyst. Therefore, an excess air ratio $\lambda$, of the air-fuel mixture may be set to 1.0±0.2.

In order to improve fuel economy performance of the engine 1, the EGR system 55 is operable, when the operating state of the engine 1 is in the low engine load region, to introduce exhaust recirculation gas (internal EGR gas and/or external EGR gas) into the combustion chamber 17. A G/F of the resulting air-fuel mixture, i.e., a mass ratio of entire gas (in-cylinder gas comprising fresh air and exhaust recirculation gas) in the combustion chamber 17 to fuel is set in the range of 18.5 to 30 (As used in this specification, the term "air" in "air-fuel mixture" means not only fresh air itself but also air diluted by exhaust recirculation gas). This air-fuel mixture is an EGR-diluted lean mixture. A dilution ratio of the air-fuel mixture is relatively high. For example, the G/F of the air-fuel mixture may be set to 25. In this case, the SI combustion can be stably performed in the low engine load region, without causing the air-fuel mixture to reach the self-ignition. In the low engine load region, the G/F of the air-fuel mixture is maintained constant, irrespective of the magnitude of the engine load of the engine 1. In this way, the SI combustion is stabilized in the entire low engine load region. Further, the engine 1 is improved in terms of fuel economy, and becomes better in terms of exhaust emission performance When the operating state of the engine 1 is in the low engine load region, the fuel amount is relatively small. Thus, as a prerequisite for enabling the λ of the air-fuel mixture to be set to 1.0±0.2, and enable the G/F to be set in the range of 18.5 to 30, a charging amount (charging efficiency) of intake gas to be introduced into the combustion chamber 17 has to be set to be less than 100%. Specifically, the ECU 10 for the engine 1 is operable to execute throttling control of adjusting the opening degree of the throttle valve 43, and/or control of retarding a valve opening timing of the intake valve 21 to a point at or after bottom dead center of an intake stroke to implement a Miller cycle.

Here, in a low engine speed region in the low engine load region, i.e., a low engine load and low engine speed region, a combustion temperature of the air-fuel mixture and the temperature of exhaust gas may be raised by further reducing the charging amount of intake gas. This is advantageous in maintaining an active state of the catalyst converter 51.

(Intermediate Engine Load Region)

When the operating state of the engine 1 is in the intermediate engine load region, the fuel injection amount is increased. Thus, the in-cylinder temperature is raised, so that it becomes possible to stably induce self-ignition. In order to achieve improvements in fuel economy and exhaust emission performance, the engine 1 is configured to perform the CI combustion in the intermediate engine load region.

Regarding combustion caused by self-ignition, if the internal temperature of the combustion chamber 17 before the start of a compression stroke varies, a self-ignition timing is largely fluctuated. For this reason, the engine 1 is configured to perform a SPCCI combustion as a combination of the SI combustion and the CI combustion) in the intermediate engine load region. In the SPCCI combustion, an air-fuel mixture in the combustion chamber 17 is forcibly spark-ignited by the spark plug 25, and combusted due to flame propagation, and the internal temperature of the combustion chamber 17 is raised due to heat generation in the SI combustion, to enable an unburned part of the air-fuel mixture to be self-ignited and combusted. The heat generation in the SI combustion can be adjusted to absorb the variation in the internal temperature of the combustion chamber before the start of the combustion stroke. Even if the internal temperature of the combustion chamber 17 before the start of the combustion stroke varies, the self-ignition timing can be controlled, e.g., by adjusting a spark ignition timing to adjust a start timing of the SI combustion.

As a prerequisite for accurately controlling the self-ignition timing in the SPCCI combustion, the self-ignition timing has to be changed in response to changing the spark ignition timing. Thus, it is preferable that sensitivity with which the self-ignition timing is changed in response to a change in the spark ignition timing is high.

According to researches by the inventors, it was found that the self-ignition timing is sufficiently changed in response to a change in the spark ignition timing, as long as the λ of an air-fuel mixture is 1.0±0.2, and the G/F of a part of the air-fuel mixture for the SI combustion (CI combustion air-fuel mixture) is in the range of 18.5 to 30. If the self-ignition timing is sufficiently changed in response to a change in the spark ignition timing, it becomes possible to accurately control the self-ignition timing, and quickly change the self-ignition timing according to the engine operating state. Regarding the remaining part of the air-fuel mixture for the CI combustion (CI combustion air-fuel mixture), the G/F may be set in the range of 30 to 50, so as to improve fuel economy while stabilizing the CI combustion. As a method for forming a G/F stratified state in which the SI combustion air-fuel mixture and the CI combustion air-fuel mixture are stratified such that the G/F of the SI combustion air-fuel mixture becomes greater than that of the CI combustion air-fuel mixture, as mentioned above, it is possible to employ a technique of narrowing a flow passage area of at least one of the intake passages leading, respectively, to the two intake ports, by using a swirl control valve or the like, to thereby form a swirl flow in the combustion chamber. As a result of forming the swirl flow, exhaust recirculation gas is gathered toward a peripheral wall of the combustion chamber, so that it becomes possible to provide a state in which the exhaust recirculation gas less exists around the spark plug at the center of the combustion chamber, and thus the G/F is relatively small. For this reason, when the operating state of the engine 1 is in the intermediate engine load region, the ECU 10 for the engine 1 is operable to set the state of the inside of the combustion chamber 17 such that the λ of the air-fuel mixture is 1.0±0.2, and the G/F of the air-fuel mixture is in the range of 18.5 to 30.

By accurately controlling the self-ignition timing, it becomes possible to avoid an increase in combustion noise when the operating state of the engine 1 is in the intermediate engine load region. Further, by performing the CI combustion under the condition that the dilution ratio of the air-fuel mixture is increased as high as possible, it becomes possible to enhance fuel economy performance of the engine 1. Furthermore, by setting the λ of the air-fuel mixture to 1.0±0.2, it becomes possible to purify exhaust gas by the three-way catalyst, and thus improve exhaust emission performance of the engine 1.

In the low engine load region, the G/F of the air-fuel mixture is set in the range of 18.5 to 30 (e.g., to 25), and the λ of the air-fuel mixture is set to 1.0±0.2, as previously mentioned. That is, between when the operating state of the engine 1 is in the low engine load region and when the operating state of the engine 1 is in the intermediate engine load region, the state quantity in the combustion chamber 17 is not largely changed. Therefore, robustness of control of the engine 1 against a change in engine load of the engine 1 is enhanced.

Differently from when the operating state of the engine 1 is in the low engine load region, when it is in the intermediate engine load region, the fuel amount is increased, and thereby it is not necessary to adjust the charging amount of intake gas to be introduced into the combustion chamber 17. Thus, the opening degree of the throttle valve 43 is in a fully opened state.

If the λ and the G/F of the air-fuel mixture are set, respectively, to 1.0±0.2 and in the range of 18.5 to 30 when the engine load of the engine 1 becomes higher and thereby the fuel amount is further increased, the amount of intake gas to be introduced into the combustion chamber 17 becomes insufficient as long as the engine 1 is operated in a naturally-aspirated state. For this reason, in a sub-region having an engine load greater than a given engine load in the intermediate engine load region, the supercharger 44 is controlled to supercharge intake gas to be introduced into the combustion chamber 17. The intermediate engine load region (B) is divided into a first intermediate engine load sub-region (B1) which has an engine load greater than the given engine load and in which supercharging is performed, and a second intermediate engine load sub-region (B2) which has an engine load equal to or less than the given engine load and in which no supercharging is performed. For example, the engine given load may be half load. The second intermediate engine load sub-region has an engine load less than that in the first intermediate engine load sub-region. In the following description, a combustion mode in the first intermediate engine load sub-region will be referred to occasionally as "supercharged SPCCI combustion", and a combustion mode in the second intermediate engine load sub-region will be referred to occasionally as "non-supercharged SPCCI combustion"

In the second intermediate engine load sub-region in which no supercharging is performed, along with an increase in the fuel amount, fresh air to be introduced into the combustion chamber 17 is gradually increased, while exhaust recirculation gas to be introduced into the combustion chamber 17 is gradually reduced. The G/F of the air-fuel mixture becomes smaller as the engine load of the engine 1 becomes higher. The throttle valve 43 is maintained in the fully opened state. Thus, the ECU 10 for the engine 1 is operable to adjust the amount of fresh air to be introduced into the combustion chamber 17 by adjusting the amount of exhaust recirculation gas to be introduced into the combustion chamber 17. In the second intermediate engine load sub-region, the state quantity in the combustion chamber 17 is appropriately set. For example, the λ of the air-fuel mixture is maintained approximately constant at 1.0, and the G/F of the air-fuel mixture is changed within the range of 25 to 28.

On the other hand, in the first intermediate engine load sub-region in which supercharging is performed, the ECU 10 for the engine 1 is operable to gradually increase both fresh air and exhaust recirculation gas to be introduced into the combustion chamber 17, along with an increase in the fuel amount. The G/F of the air-fuel mixture is maintained constant even when the engine load of the engine 1 becomes higher. In the first intermediate engine load sub-region, the state quantity in the combustion chamber 17 is appropriately set. For example, the λ of the air-fuel mixture is maintained approximately constant at 1.0, and the G/F of the air-fuel mixture is maintained constant at 25.

(High Engine Load Region)

When the operating state of the engine 1 is in the high engine load region, the fuel injection amount is relatively large. Thus, it becomes difficult to suppress combustion noise even by performing the SPCCI combustion. Moreover, although it is attempted to adequately perform the CI combustion, abnormal combustion such as premature ignition or knocking is more likely to occur, due to a rise in the in-cylinder temperature. Therefore, a combustion mode to be performed when the operating state of the engine 1 is in the high engine load region is the SI combustion. In the following description, the combustion mode in the high engine load region will be referred to occasionally to "high engine load SI combustion".

When the operating state of the engine 1 is in the high engine load region, the λ of an air-fuel mixture is set to 1.0±0.2. Further, the G/F of the air-fuel mixture is set in the range of 18.5 to 30. In the high engine load region, the opening degree of the throttle valve 43 is in the fully opened state, and the supercharger 44 is activated to perform supercharging.

In the high engine load region, the ECU 10 for the engine 1 is operable to gradually reduce the amount of exhaust recirculation gas along with an increase in engine load. The G/F of the air-fuel mixture becomes smaller as the engine load of the engine 1 becomes higher. The amount of fresh air to be introduced into the combustion chamber 17 is increased by an amount corresponding to the reduction in amount of exhaust recirculation gas, so that it becomes possible to increase the fuel amount. This is advantageous in increasing the maximum power output of the engine 1. In the high engine load region, the G/F of the air-fuel mixture is changed within the range, e.g., of 17 to 25.

That is, between when the operating state of the engine 1 is in the high engine load region and when the operating state of the engine 1 is in the intermediate engine load region, the state quantity in the combustion chamber 17 is not largely changed. Therefore, robustness of control of the engine 1 against a change in engine load of the engine 1 is enhanced.

In the high engine load region, although the engine 1 performs the SI combustion as previously mentioned, there is a problem that abnormal combustion such as premature ignition or knocking is more likely to occur, due to the high geometric compression ratio.

For this region, the ECU 10 for the engine 1 is configured to avoid such abnormal combustion based on improvement of a fuel injection mode in the high engine load region. Specifically, the ECU 10 is operable to output a control signal to the fuel supply system 61 and the injector 6 so as to cause the injector 6 to inject fuel into the combustion chamber 17, with a high fuel pressure of 30 MPa or more and at a timing within a time period from a late phase of a compression stroke to an early phase of the subsequent expansion stroke (this time period will hereinafter be referred to as "retard period"). The ECU 10 is also operable, after the fuel injection, to output a control signal to the spark plug 25 so as to cause the spark plug 25 to ignite the air-fuel mixture at a timing around top dead center of a compression stroke. In the following description, injecting fuel into the combustion chamber 17 with a high fuel pressure and at a timing within the retard period will be referred to as "high-pressure retarded injection".

The high-pressure retarded injection makes it possible to shorten a time period during which the air-fuel mixture is subjected to reaction (reactable period of the air-fuel mixture), to thereby avoid the abnormal combustion. Here, the reactable period of the air-fuel mixture means a sum of: (1) a time period during which the injector 6 injects fuel (i.e., injection period); (2) a time period after completion of the fuel injection through until a combustible air-fuel mixture is formed around the spark plug 25 (i.e., air-fuel mixture formation period); and (3) a time period after the start of the SI combustion caused by spark ignition through until the SI combustion is completed ((3) combustion period).

When fuel injected into the combustion chamber 17 with a high fuel pressure, each of the injection period and the air-fuel mixture formation period is shortened. As a result of the shortening of the injection period and the air-fuel mixture formation period, it becomes possible to shift a timing of the start of fuel injection toward the spark ignition timing. In the high-pressure retarded injection, fuel is injected into the combustion chamber 17 with a high fuel pressure, so that the fuel injection can be performed at a timing within the retard period from a late phase of a compression stroke to an early phase of the subsequent expansion stroke.

When fuel is injected into the combustion chamber 17 with a high fuel pressure, turbulence energy in the combustion chamber 17 is increased. Further, when the fuel injection timing is set to a point close to top dead center of a compression stroke, the SI combustion can be started with high turbulence energy in the combustion chamber 17. As a result, the combustion period is shortened.

As above, the high-pressure retarded injection makes it possible to shorten each of the injection period, the air-fuel mixture formation period and the combustion period. As compared to a case where fuel is injected into the combustion chamber 17 during an intake stroke, the high-pressure retarded injection makes it possible to significantly shorten the reactable period of the air-fuel mixture. As a result of the shortening of the reactable period of the air-fuel mixture, the high-pressure retarded injection makes it possible to avoid the abnormal combustion.

In the technical field of engine controls, as means to avoid the abnormal combustion, a technique of retarding the spark ignition timing has heretofore been employed. However, retarding the spark ignition timing causes deterioration in fuel economy performance. The high-pressure retarded injection is free of the need to retard the spark ignition timing. Thus, by utilizing the high-pressure retarded injection, fuel economy performance is improved.

For example, the fuel pressure may be set to 30 MPa or more. In this case, it is possible to effectively shorten each of the injection period, the air-fuel mixture formation period and the combustion period. Here, it is preferable that the fuel pressure is appropriately set depending on properties of fuel. As one example, an upper limit of the fuel pressure may be set to 120 MPa.

In the high engine load region, when an engine speed of the engine 1 is relatively low, a time period during which crank angle changes by the same angle is relatively long. Thus, shortening the reactable period of the air-fuel mixture by the high-pressure retarded injection is particularly advantageous in avoiding the abnormal combustion. On the other hand, when the engine speed of the engine 1 becomes higher, the time period during which the crank angle changes by the same angle becomes shorter. Thus, shortening the reactable period of the air-fuel mixture is not so advantageous in avoiding the abnormal combustion.

Further, in the high-pressure retarded injection, fuel is injected into the combustion chamber 17 only after the crank angle reaches around top dead center of a compression stroke. Thus, in the compression stroke, gas containing no fuel, i.e., gas having a relatively high specific heat ratio, is compressed in the combustion chamber 17. If the high-pressure retarded injection is performed when the engine speed of the engine 1 is relatively high, an in-cylinder temperature at top dead center of a compression stroke, i.e., a compression-end temperature, is undesirably raised. The rise in the compression-end temperature is likely to lead to abnormal combustion such as knocking.

For this reason, in the engine 1, the high engine load region (C) is divided into a first high engine load sub-region (C1) on a low engine speed side, and a second high engine load sub-region (C2) having an engine speed greater than that in the first high engine load sub-region (C1). On the assumption that the high engine load region is equally divided into three sub-regions consisting of a low engine speed sub-region, an intermediate engine speed sub-region and a high engine speed sub-region, the first high engine load sub-region may be defined as a sum of the low engine speed sub-region and the intermediate engine speed sub-region. Further, on the same assumption that the high engine load region is equally divided into three sub-regions consisting of a low engine speed sub-region, an intermediate engine speed sub-region and a high engine speed sub-region, the first high engine load sub-region may be defined as the high engine speed sub-region.

In the first high engine load sub-region, the injector 6 is operable, in response to receiving a control signal of the ECU 10, to perform the aforementioned high-pressure retarded injection. In the second high engine load sub-region, the injector 6 is operable, in response to receiving a control signal of the ECU 10, to perform fuel injection at a given timing during an intake stroke. Generally, fuel injection to be performed during an intake stroke does not require a high fuel pressure. The ECU 10 is operable to output a control signal to the fuel supply system 61 so as to cause the fuel pressure to become less than that for the high-pressure retarded injection (e.g., to become less than 40 MPa). As a result of lowering of the fuel pressure, a mechanical resistance loss in the engine 1 is reduced, which is advantageous in improving fuel economy.

Further, as a result of injecting fuel into the combustion chamber 17 during an intake stroke, the specific heat ratio of the gas in the combustion chamber is reduced, and thereby the compression-end temperature is lowered. The lowered compression-end temperature allows the engine 1 to avoid the abnormal combustion. There is no need to retard the spark ignition timing in order to avoid the abnormal combustion. Thus, in the second high engine load sub-region, the spark plug 25 is operable to ignite the air-fuel mixture at a timing around top dead center of a compression stroke, in the same manner as that in the first high engine load sub-region.

In the first high engine load sub-region, the high-pressure retarded injection prevents the air-fuel mixture from reaching self-ignition. This allows the engine 1 to stably perform the SI combustion. In the second high engine load sub-region, the fuel injection during an intake stroke prevents the air-fuel mixture from reaching self-ignition. This allows the engine 1 to stably perform the SI combustion.

<SPCCI Combustion>

Figure 5A:
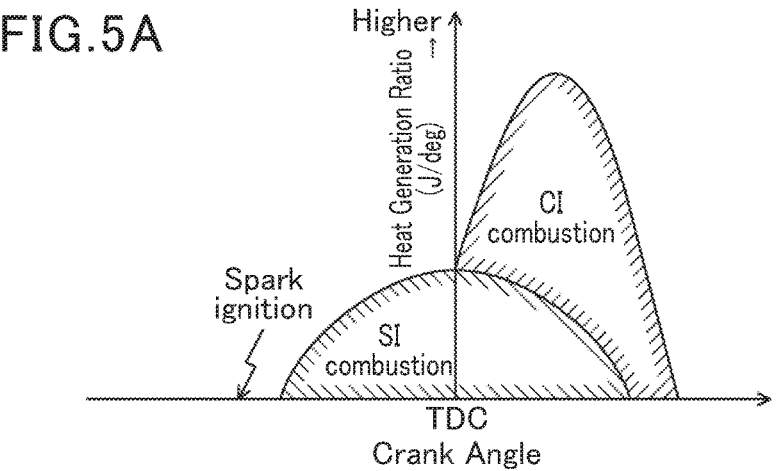
FIGS. 5A to 5C are explanatory diagrams about the definition of a SI ratio in an SPCCI combustion according to this embodiment.
Figure 5B:
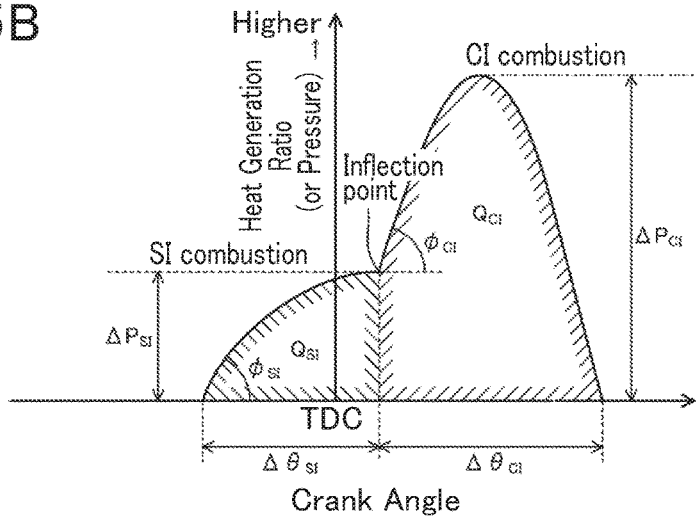
Figure 5C:
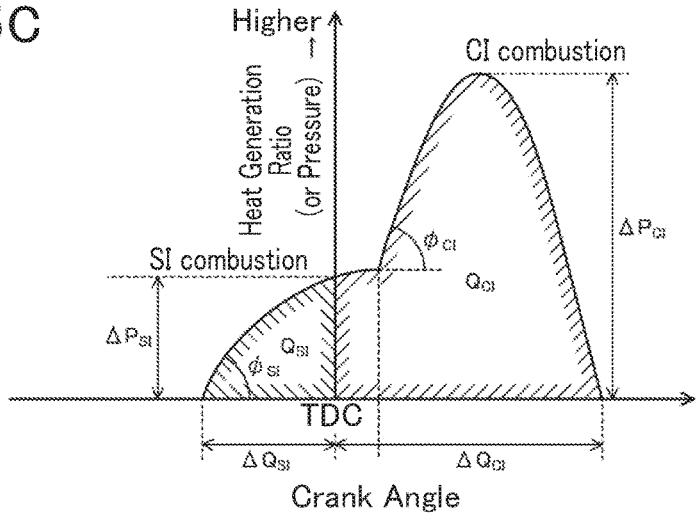

Next, with reference to FIGS. 5A to 5C, the aforementioned SPCCI combustion will be described in more detail. Charts (a) to (c) in FIGS. 5A to 5C present waveforms each exemplifying a change in heat generation ratio with respect to the crank angle, in the SPCCI combustion. Upon ignition of the air-fuel mixture by the spark plug 25 at a given timing around top dead center of a compression stroke, more accurately, before top dead center of a compression stroke, combustion caused by flame propagation is started. Heat generation during the SI combustion is gentler than heat generation during the CI combustion. Thus, in a waveform of the heat generation ratio, an inclination (slope angle) hereof becomes relatively small. Although not depicted, a pressure change $(dp/d\theta)$ in the combustion chamber 17 during the SI combustion also becomes gentler than that during the CI combustion.

Then, in a situation where the in-cylinder temperature and the in-cylinder pressure are raised by the SI combustion, an unburned part of the air-fuel mixture is self-ignited. In the example of the chart FIG. 5A, the inclination of the waveform of the heat generation ratio is changed from a small level to a large level approximately at top dead center of a compression stroke. That is, the waveform of the heat generation ratio has an inflection point at a timing when the CI combustion is stated.

After the start of the CI combustion, the SI combustion and the CI combustion are concurrently performed. The CI combustion generates a larger amount of heat as compared to the SI combustion, and thereby the heat generation ratio of the CI combustion becomes relatively large. However, because the CI combustion is performed after top dead center of a compression stroke, the piston 3 is moved downwardly by motoring. This makes it possible to avoid a situation where the inclination of the waveform of the heat generation ratio during the CI combustion becomes excessively large. The dp/dθ during the CI combustion also becomes relatively gentle.

While the dp/dθ can be used as an index indicative of combustion noise, the SPCCI combustion is capable of reducing the dp/dθ, as previously mentioned. This means that the SPCCI combustion makes it possible to avoid a situation where combustion noise becomes excessively large. The combustion noise can be suppressed to an allowable level or less.

When the CI combustion is completed, the SPCCI combustion is completed. The CI combustion has a shorter combustion period as compared to the SI combustion. Thus, in the SPCCI combustion, a combustion completion timing is advanced as compared to the case where the SI combustion is singly implemented. In other words, in the SPCCI combustion, the combustion completion timing during an expansion stroke can be shifted toward top dead center of a compression stroke. As compared to the singly-implemented SI combustion, the SPCCI combustion is advantageous in improving fuel economy performance of the engine.

Therefore, the SPCCI combustion makes it possible to satisfy both the need to prevent combustion noise and the need to improve fuel economy performance.

Here, a SI ratio is defined as a parameter indicative of a characteristic of the SPCCI combustion. The SI ratio is defined as the ratio of a heat amount generated by the SI combustion, with respect to a total heat amount generated by the SPCCI combustion. That is, in the chart (a), the SI ratio=(area of the SI combustion)/(area of the SPCCI combustion). In other words, in the SPCCI combustion as the combination of the SI combustion and the CI combustion, the SI ratio is the ratio of the SI combustion to the CI combustion. Thus, a higher SI ratio means that the ratio of the SI combustion is increased, and a lower SI ratio means that the ratio of the CI combustion is increased.

However, the SI ratio is not limited to the above definitions. For the SI ratio, various other definitions can be conceived. For example, the SI ratio may be defined as the ratio of a heat amount generated by the SI combustion, with respect to a heat amount generated by the CI combustion. That is, in the chart (a), the SI ratio may be defined as (area of the SI combustion)/(area of the CI combustion).

In the SPCCI combustion, at the timing when the CI combustion is started, the waveform of the heat generation ratio has an inflection point. Then, as depicted in the chart (b) FIG. 5B, with respect to a boundary line intersecting the inflection point in the waveform of the heat generation ratio, a region on an advance side may be defined as a SI combustion region, and a region on a retard side may be defined as a CI combustion region. In this case, based on an area $Q_{SI}$ of the region on the advance side with respect to the boundary line, and an area $Q_{CI}$ of the region on the retard side with respect to the boundary line, as indicated as hatched regions in the chart (b), the SI ratio may be defined as $Q_{SI}/(Q_{SI}+Q_{CI})$ or may be defined as $Q_{SI}/Q_{SC}$. Alternatively, the SI ratio may be defined based on a partial area of the region on the advance side with respect to the boundary line and a partial area of the region on the retard side with respect to the boundary line, instead of the entire areas thereof.

Alternatively, instead of defining the SI ratio based on heat generation, based on a crank angle range $\Delta\theta_{SI}$ of the region on the advance side with respect to the boundary line, and a crank angle range $\Delta\theta_{CI}$ of the region on the retard side with respect to the boundary line, the SI ratio may be defined as $\Delta\theta_{SI}/(\Delta\theta_{SI}+\Delta\theta_{CI})$, or may be defined as $\Delta\theta_{SI}/\Delta\theta_{CI}$.

Alternatively, based on a peak $\Delta P_{SI}$ of the heat generation rare in the region on the advance side with respect to the boundary line, and a peak $\Delta P_{CI}$ of the heat generation rare in the region on the retard side with respect to the boundary line, the SI ratio may be defined as $\Delta P_{SI}(\Delta P_{SI}+\Delta P_{CI})$, or may be defined as $\Delta P_{SI}/\Delta P_{CI}$.

Alternatively, based on an inclination $\varphi_{S1}$ of the heat generation rare in the region on the advance side with respect to the boundary line, and an inclination $\varphi_{C1}$ of the heat generation rare in the region on the retard side with respect to the boundary line, the SI ratio may be defined as $\varphi_{SI}/(\varphi_{SI}+\varphi_{CI})$, or may be defined as $\varphi_{SI}/\varphi_{CI}$.

In these cases, the SI ratio is defined based on the waveform of the heat generation ratio, specifically, the area (i.e., the magnitude of the heat generation amount), the length of the horizontal axis (i.e., the magnitude of the crank angle range), the length of the vertical axis (i.e., the magnitude of the heat generation ratio) or the inclination (i.e., the ratio of change of the heat generation ratio). Alternatively, the SI ratio may be defined based on a waveform of the in-cylinder pressure (P), specifically, the area, the length of the horizontal axis, the length of the vertical axis or the inclination, although depiction thereof is omitted.

In the SPCCI combustion, the inflection point in the combustion waveform relating to the heat generation ratio or the in-cylinder pressure does not always clearly appear. As the definition of the SI ratio which is not based on the inflection point, the following definition may be employed. As depicted in the chart FIG. 5C, in the combustion waveform, a region on the advance side with respect to top dead center (TDC) of a compression stroke may be defined as a SI combustion region, and a region on the retard side with respect to the top dead center of the compression stroke may be defined as a CI combustion region Then, the SI ratio may be defined based on the area ($Q_{SI}$, $Q_{CI}$), the length of the horizontal axis ($\Delta\theta_{SI}$, $\Delta\theta_{CI}$), the length of the vertical axis ($\Delta P_{SI}$, $\Delta P_{CI}$), or the inclination ($\varphi_{SI}$, $\varphi_{CI}$), in the similar manner to that described above.

Alternatively, the SI ratio may be defined based on the fuel amount, instead of being defined based on the waveform of combustion actually performed in the combustion chamber 17. A split injection comprising an early-stage injection and a late-stage injection is performed in the intermediate engine load region where the SPCCI combustion is performed, as will be discussed later. Fuel injected into the combustion chamber 17 by the late-stage injection is located around the spark plug 25 without being diffused in the combustion chamber 17 because a time period from the injection to spark ignition is relatively short. Thus, the fuel injected into the combustion chamber 17 by the late-stage injection is combusted mainly by the SI combustion. On the other hand, fuel injected into the combustion chamber 17 by the early-stage injection is combusted mainly by the CI combustion. Thus, the SI ratio can be defined based on a fuel amount ($m_1$) to be injected by the early-stage injection and a fuel amount ($m_2$) to be injected by the late-stage injection. That is, the SI ratio may be defined as $m_2/(m_1+m_2)$, or may be defined as $m_2/m_1$.

<Basic Operation Control for Engine>

The ECU 10 for the engine 1 operates to switch between the SI combustion and the SPCCI combustion according to the operating state of the engine 1, as previously mentioned. The ECU 10 also operates to change the SI ratio according to the operating state of the engine 1. As a result of expanding the operating range in which combustion caused by self-ignition is performed, the engine 11 can satisfy both the need to suppress the occurrence of combustion noise and the need to improve fuel economy.

Figure 6:
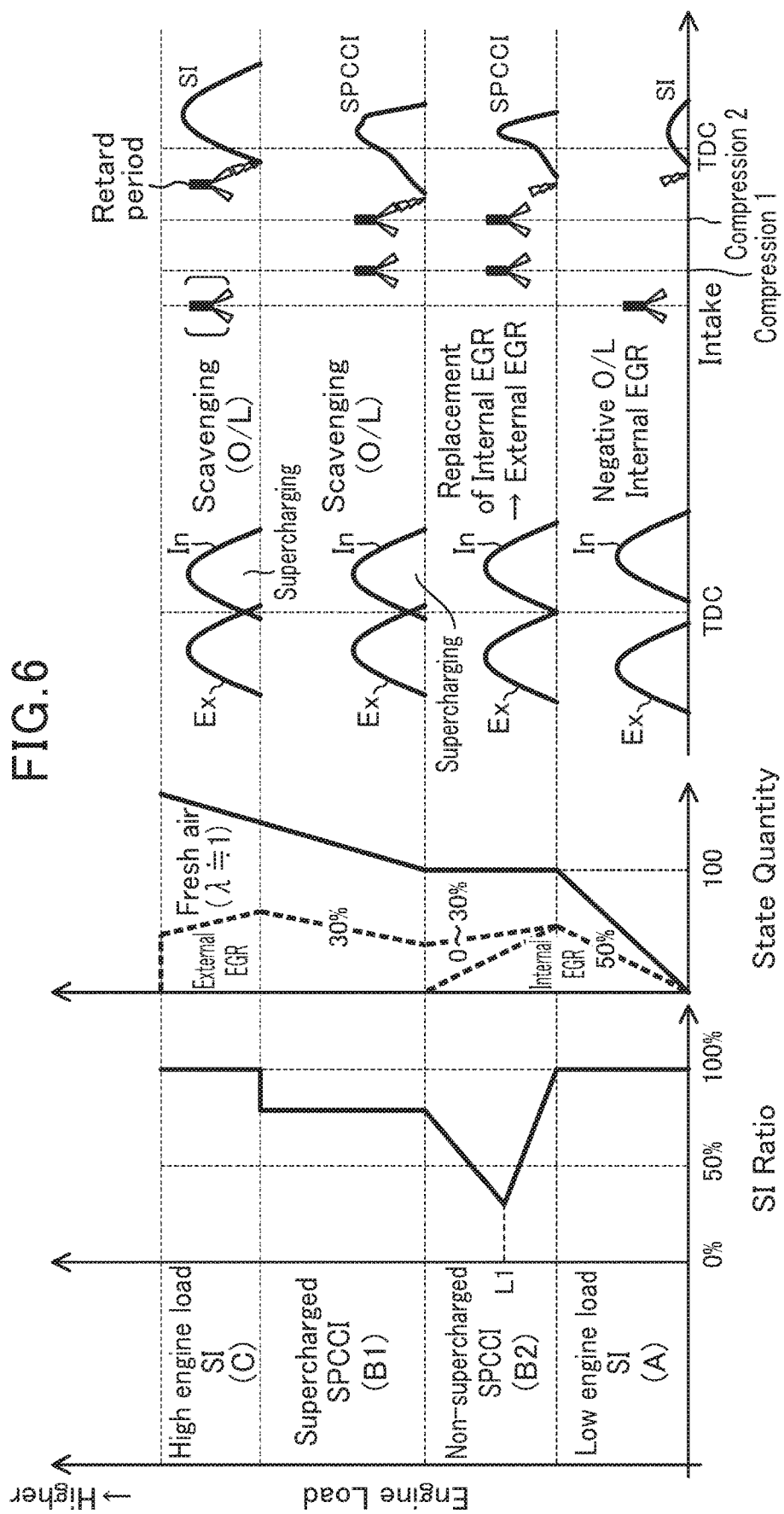
FIG. 6 is an explanatory diagram about a change in SI ratio, a change in state quantity in the combustion chamber, a change in valve overlap period between a an intake valve and an exhaust valve, and changes in fuel injection timing and spark ignition timing, with respect to engine load, according to this embodiment.

FIG. 6 exemplifies a change in the SI ratio, a change in the state quantity in the combustion chamber 17, respective changes in the valve-open period of the intake valve and the valve-open period of the exhaust valve, and respective changes in the fuel injection timing and the spark ignition timing, with respect to the magnitude of the engine load of the engine 1. The basic operation control for the engine 1 by the control device according to this embodiment will be described below, based on the assumption that the engine load of the engine 1 is gradually increased while the engine speed of the engine 1 is maintained at a given value.

(Low Engine Load Region (Low Engine Load SI Combustion))

In the low engine load region (A), the engine 1 is controlled to perform the low engine load SI combustion.

When the operating state of the engine 1 is in the low engine load region, the SI ratio is maintained constant at 100%.

In the low engine load region, the G/F of the air-fuel mixture is set to a constant value selected from the range of 18.5 to 30, as previously mentioned. The ECU 10 for the engine 1 operates to introduce, into the combustion chamber 17, fresh air and burned gas in an amount appropriate to the fuel amount. The introduction amount of fresh air is adjusted by executing throttling control and/or implementing a Miller cycle, as previously mentioned. Considering a high dilution ratio, the in-cylinder temperature is raised so as to stabilize the SI combustion. In the low engine load region, the ECU 10 operates to introduce internal EGR gas into the combustion chamber 17.

The internal EGR gas is introduced into the combustion chamber 17 (i.e., burned gas is partly confined in the combustion chamber 17) by providing a negative overlap period during which both the intake valve 21 and the exhaust valve 22 are closed across top dead center of an exhaust stroke. The adjustment of the amount of internal EGR gas is performed by adjusting the valve-open period of the intake valve using the electric intake VVT device 23 and adjusting the valve-open period of the exhaust valve using the electric exhaust VVT device 24 to thereby appropriately set the length of the negative overlap period.

In the low engine load region, the charging amount of intake gas to be introduced into the combustion chamber 17 is adjusted to be less than 100%. Along with an increase in the fuel amount, the amount of fresh air to be introduced into the combustion chamber 17 and the amount of internal EGR gas are gradually increased. An EGR ratio (mass ratio of exhaust recirculation gas to entire gas in the combustion chamber 17) in the low engine load region is, e.g., 50%.

The injector 6 is controlled to inject fuel into the combustion chamber 17 during an intake stroke. Thus, a homogenous air-fuel mixture having an excess air ratio λ of 1.0±0.2 and a gas/fuel ratio G/F of 18.5 to 30 is formed in the combustion chamber 17. The spark plug 25 is controlled to ignite the air-fuel mixture at a timing before top dead center of a compression stroke, so that the air-fuel mixture is combusted due to flame propagation without reaching self-ignition.

(Second Intermediate Engine Load Sub-Region (Non-Supercharged SPCCI Combustion)

When the engine load of the engine 1 is increased, and the operating state of the engine 1 enters the second intermediate engine load sub-region (B2), the ECU 10 for the engine 1 operates to switch the combustion mode from the low engine speed SI combustion to the non-supercharged SPCCI combustion. The SI ratio is set to be less than 100%. Along with an increase in engine load of the engine 1, the fuel amount is gradually increased. When the engine load is relatively low in the second intermediate engine load sub-region, the ratio of the CI combustion is gradually increased along with an increase in the fuel amount. In this situation, the SI ratio is gradually reduced along with an increase in engine load of the engine 1. In the example of FIG. 6, the SI ratio is reduced to a given value (minimum value) of 50% or less.

In the second intermediate engine load sub-region, the combustion chamber is raised due to the increased fuel amount. If the in-cylinder temperature is excessively raised, heat generation during the start of the CI combustion is intensified. Then, combustion noise is undesirably increased.

For this reason, in the second intermediate engine load sub-region, a ratio between the internal EGR das and the external EGR gas is changed in response to a change in engine load of the engine 1, so as to adjust the internal temperature of the combustion chamber 17 before the start of a compressing stroke. Specifically, along with an increase in engine load of the engine 1, the hot internal EGR gas is gradually reduced while the cooled external EGR gas is gradually increased. In the second intermediate engine load sub-region, the negative overlap period is changed from the maximum value until it becomes zero, along with an increase in engine load. When the engine load is maximally increased in the second intermediate engine load sub-region, the internal EGR gas becomes zero.

In the second intermediate engine load sub-region, the opening degree of the EGR valve 54 is changed such that the external EGR gas is gradually increased along with an increase in engine load. The amount of the external EGR gas to be introduced into the combustion chamber 17 is adjusted within the range, e.g., of 0 to 30%, as expressed by the EGR ratio. In the second intermediate engine load sub-region, the internal EGR gas is gradually replaced with the external EGR, along with an increase in engine load of the engine 1.

The amount of exhaust recirculation gas to be introduced into the combustion chamber 17 continuously changes between the low engine load region and the second intermediate engine load sub-region. In a part of the second intermediate engine load sub-region having a relatively low engine load, the internal EGR gas is introduced into the combustion chamber 17 in a large amount, as with the low engine load region. Thus, the in-cylinder temperature is raised, so that the air-fuel mixture is reliably self-ignited when the engine load of the engine 1 is relatively low. In the remaining part of the second intermediate engine load sub-region having a relatively high engine load, the external EGR gas is introduced into the combustion chamber 17. Thus, the in-cylinder temperature is lowered, so that it becomes possible to suppress combustion noise caused by the CI combustion when the engine load of the engine 1 is relatively high.

In the second intermediate engine load sub-region, the charging amount (charging efficiency) of intake gas to be introduced into the combustion chamber 17 is set to 100%. The opening degree of the throttle valve 43 is in the fully opened state. The amount of exhaust recirculation gas as a combination of the internal EGR gas and the external EGR gas is adjusted to adjust the amount of fresh air to be introduced into the combustion chamber 17, depending on the fuel amount.

As the ratio of the CI combustion in the non-supercharged SPCCI combustion becomes larger, the self-ignition timing is gradually advanced. If the self-ignition timing is advanced beyond top dead center of a compression stroke, heat generation during the start of the CI combustion is intensified. Then, combustion noise is undesirably increased. For this reason, after the engine load of the engine 1 reaches a given value L1, the ECU 10 for the engine 1 operates to gradually increase the SI ratio along with an increase in engine load of the engine 1.

That is, the ECU 10 operates to gradually increase the ratio of the SI combustion along with an increase in the fuel amount. Specifically, in the non-supercharged SPCCI combustion, the spark ignition timing is gradually advanced along with an increase in the fuel amount. As mentioned above, the in-cylinder temperature is adjusted by reducing the introduction amount of the internal EGR gas while increasing the introduction amount of the external EGR gas. Thus, it becomes possible to suppress a rise in the in-cylinder temperature due to the SI combustion, even when the fuel amount is increased. The ratio of change of the heat generation ratio in the SI combustion is controlled such that it is almost not changed even when the engine load becomes higher. When the spark ignition timing is advanced, the start timing of the SI combustion is advanced, and the heat generation amount in the SI combustion is increased accordingly.

As a result of suppressing a rise in the internal temperature of the combustion chamber 17 due to the SI combustion, an unburned part of the air-fuel mixture is self-ignited at a timing of or after top dead center of a compression stroke. The heat generation by the CI combustion is maintained approximately even when the engine load of the engine 1 becomes higher, because the heat generation amount in the SI combustion is increased. Thus, by setting the SI ratio such that it is gradually increased in response to an increase in engine load of the engine 1, it becomes possible to avoid an undesirable increase in combustion noise. The combustion gravity center of the non-supercharged SPCCI combustion is gradually retarded as the engine load becomes higher.

In the second intermediate engine load sub-region, the injector 6 is controlled to inject fuel into the combustion chamber 17 during a compression stroke, in two injections consisting of an early-stage injection and a late-stage injection. The early-stage injection is designed to inject fuel at a timing apart from the spark ignition timing, and the late-stage injection is designed to inject fuel at a timing close to the spark ignition timing. As a result, an approximately homogenous air-fuel mixture having an excess air ratio of 1.0±0.2 and a G/F of 18.5 to 30 is formed in the combustion chamber 17. The approximately homogenous air-fuel mixture makes it possible to improve fuel economy based on reduction in unburned fuel loss, and improve exhaust emission performance based on avoidance of the occurrence of smoke.

The spark plug 25 is controlled to ignite the air-fuel mixture at a given timing before top dead center of a compression stroke, so that the air-fuel mixture is combusted due to flame propagation. Subsequently, an unburned part of the air-fuel mixture is self-ignited and subjected to the CI combustion. Fuel injected by the late-stage injection is combusted mainly by the SI combustion. Fuel injected by the early-stage injection is combusted mainly by the CI combustion. The early-stage injection is performed during a compression stroke, so that it becomes possible to prevent a situation where fuel injected by the early-stage injection induces abnormal combustion such as premature ignition. Further, it becomes possible to enable fuel injected by the late-stage injection to be stably combusted due to flame propagation.

(First Intermediate Engine Load Sub-Region (Supercharged SPCCI Combustion))

When the engine load of the engine 1 is further increased, and the operating state of the engine 1 enters the first intermediate engine load sub-region (B1), the supercharger 44 is controlled to supercharge fresh air and external EGR gas. Each of the amount of fresh air and the amount of external EGR gas to be introduced into the combustion chamber 17 is gradually increased, as the engine load of the engine 1 becomes higher. In terms of EGR ratio, the amount of external EGR gas to be introduced into the combustion chamber 17 is, e.g., 30%. The EGR ratio is maintained constant, irrespective of the magnitude of the engine load of the engine 1. Thus, the G/F of the air-fuel mixture is also maintained constant, irrespective of the magnitude of the engine load of the engine 1. The amount of exhaust recirculation gas to be introduced into the combustion chamber 17 continuously changes between the second intermediate engine load sub-region and the first intermediate engine load sub-region.

The SI ratio is maintained constant at a given value of less than 100%, irrespective of the magnitude of the engine load of the engine 1. Comparing the SI ratio in the second intermediate engine load sub-region, particularly, the SI ratio to be set after the engine load is increased beyond the given valve L1, such that a value thereof is gradually increased along with an increase in engine load of the engine 1, to the SI ratio in the first intermediate engine load sub-region, the SI ratio in the first intermediate engine load sub-region in which the engine load of the engine 1 is relatively high is greater than the SI ratio in the second intermediate engine load sub-region. The SI ratio continuously changes in a boundary area between the first intermediate engine load sub-region and the second intermediate engine load sub-region.

In the supercharged SPCCI combustion, the spark ignition timing is gradually advanced along with an increase in the fuel amount. The respective amounts of fresh air and external EGR gas to be introduced into the combustion chamber 17 are increased by supercharging, as mentioned above, and thereby the in-cylinder gas has a large heat capacity. This makes it possible to suppress a rise in the in-cylinder temperature due to the SI combustion, even when the fuel amount is increased. A waveform of the heat generation ratio in the supercharged SPCCI combustion is gradually enlarged in a similarity relationship, along with an increase in engine load.

That is, the heat generation amount in the SI combustion is increased, while the ratio of change of the heat generation ratio in the SI combustion is almost not changed. An unburned part of the air-fuel mixture is self-ignited at approximately the same timing of or after top dead center of a compression stroke. The heat generation amount in the CI combustion becomes larger as the engine load of the engine 1 becomes higher. As a result, in the first intermediate engine load sub-region, the heat generation amount in the SI combustion and the heat generation amount in the CI combustion are concurrently increased, and thereby the SI ratio is maintained constant, irrespective of the magnitude of the engine load of the engine 1. As a peak of the heat generation in the CI combustion becomes higher, combustion noise becomes larger. However, in the first intermediate engine load sub-region, the engine load of the engine 1 is relatively high, and thereby a certain level of combustion noise can be permitted. The combustion gravity center of the supercharged SPCCI combustion is gradually retarded as the engine load becomes higher.

In the first intermediate engine load sub-region, an overlap period is provided during which both the intake valve 21 and the exhaust valve 22 are opened across top dead center of an exhaust stroke. In this way, burned gas remaining in the combustion chamber 17 is scavenged by the supercharging pressure. As a result, the in-cylinder temperature is lowered, so that it becomes possible to suppress a situation where the abnormal combustion occurs when the engine load of the engine 1 is relatively high. Further, by lowering the in-cylinder temperature, it becomes possible to set the self-ignition timing to an adequate timing to maintain the SI ratio at a given value, in a part of the first intermediate engine load sub-region having a relatively high engine load. Furthermore, by scavenging the burned gas, it becomes possible to increase a charging amount (charging efficiency) of fresh air to be introduced into the combustion chamber 17.

In the first intermediate engine load sub-region, the injector 6 is controlled to inject fuel into the combustion chamber 17 during a compression stroke, in two injections consisting of an early-stage injection and a late-stage injection, in the same manner as that in the second intermediate engine load sub-region. The early-stage injection is designed to inject fuel at a timing apart from the spark ignition timing, and the late-stage injection is designed to inject fuel at a timing close to the spark ignition timing. As a result, an approximately homogenous air-fuel mixture having an excess air ratio of 1.0±0.2 and a G/F of 18.5 to 30 is formed in the combustion chamber 17. The approximately homogenous air-fuel mixture makes it possible to improve fuel economy based on reduction in unburned fuel loss, and improve exhaust emission performance based on avoidance of the occurrence of smoke.

The spark plug 25 is controlled to ignite the air-fuel mixture at a given timing before top dead center of a compression stroke, so that the air-fuel mixture is combusted due to flame propagation. Subsequently, an unburned part of the air-fuel mixture is self-ignited and subjected to the CI combustion. Fuel injected by the late-stage injection is combusted mainly by the SI combustion. Fuel injected by the early-stage injection is combusted mainly by the CI combustion. The early-stage injection is performed during a compression stroke, so that it becomes possible to prevent a situation where fuel injected by the early-stage injection induces abnormal combustion such as premature ignition. Further, it becomes possible to enable fuel injected by the late-stage injection to be stably combusted due to flame propagation.

(High Engine Load Region (High Engine Load SI Combustion))

When the engine load of the engine 1 is further increased, and the operating state of the engine 1 enters the high engine load region (C), the engine 1 is controlled to perform the high engine load SI combustion. Thus, in the high engine load region, the SI ratio is set to 100%.

The throttle valve 43 is fully opened. In the high engine load region, the supercharger 44 is controlled to supercharge fresh air and external EGR gas. The EGR valve 54 is controlled to adjust the opening degree thereof such that the introduction amount of external EGR gas is gradually reduced along with an increase in engine load of the engine 1. In this way, fresh air to be introduced into the combustion chamber 17 is gradually increased as the engine load of the engine 1 becomes higher. When the amount of fresh air is increased, the fuel amount can be increased. This is advantageous in increasing the maximum power output of the engine 1. The amount of exhaust recirculation gas to be introduced into the combustion chamber 17 continuously changes between the first intermediate engine load sub-region and the high engine load region.

In the high engine load region, an overlap period is provided during which both the intake valve 21 and the exhaust valve 22 are opened across top dead center of an exhaust stroke, in the same manner as that in the first intermediate engine load sub-region. In this way, burned gas remaining in the combustion chamber 17 is scavenged by the supercharging pressure. As a result, the abnormal combustion is suppressed. Further, the charging amount (charging efficiency) of fresh air to be introduced into the combustion chamber 17 can be increased.

In a part of the high engine load region on the low engine speed side (i.e., the first high engine load sub-region (C1)), the injector 6 is controlled to inject fuel into the combustion chamber 17 within the retard period, as mentioned above. In the remaining part of the high engine load region on the high engine speed side (i.e., the second high engine load sub-region (C2)), the injector 6 is controlled to inject fuel into the combustion chamber 17, during an intake stroke. In either case, a homogenous air-fuel mixture having an excess air ratio λ of 1.0±0.2 and a G/F of 18.5 to 30 is formed in the combustion chamber 17. The air-fuel mixture is spark-ignited by the spark plug 25 at a given timing before top dead center of a compression stroke, and combusted due to flame propagation. In the high load region, based on the effect of the high-pressure retarded injection or the fuel injection during an intake stroke, the air-fuel mixture is subjected to the SI combustion without reaching self-ignition.

<Relationship Between Engine Load and Each of SI Rate and Self-Ignition Timing>

Next, control of the SI ratio and the self-ignition timing by the control device according to this embodiment will be described. In this embodiment, the ECU 10 functions as the means/part to control the SI ratio (first control means/part) and the means/part to control the self-ignition timing (second control means/part), to thereby change respective combustion states of both the SI combustion and the CI combustion in each combustion cycle of the engine 1, according to the operating state of the engine 1. In this way, the ECU 10 operates to attain a desired SPCCI combustion waveform. Specifically, the ECU 10 operates to attain a desired SI ratio and a desired self-ignition timing.

Figure 7:
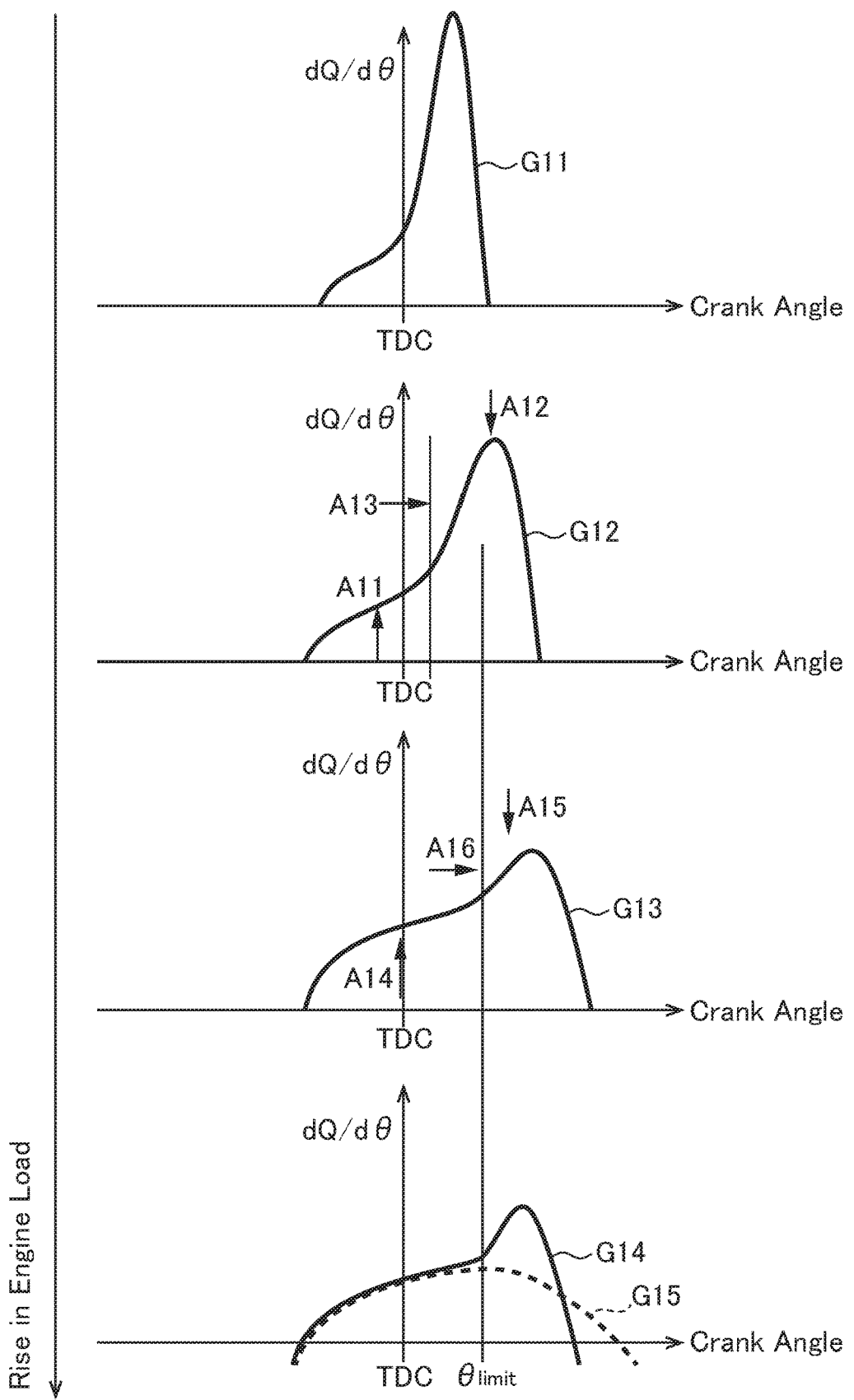
FIG. 7 is an explanatory diagram about the relationship of engine load and each of SI ratio and self-ignition timing, according to this embodiment.

With reference to FIG. 7, control of the SI ratio and the self-ignition timing to be executed according to the engine load by the ECU 10 in this embodiment will be specifically described. FIG. 7 is an explanatory diagram about the relationship of the engine load and each of the SI ratio and the self-ignition timing, in regard to control by the control device according to this embodiment.

FIG. 7 presents a plurality of combustion waveforms (i.e., heat generation patterns) of the SPCCI combustion to be used in conformity to the engine load, wherein the horizontal axis represents crank angle, and the vertical axis represents heat generation ratio (dQ/dθ). The combustion waveforms presented in FIG. 7 is typically used in the second intermediate engine load sub-region (B2) free of supercharging, more specifically, the part of the second intermediate engine load sub-region (B2) having an engine load greater than the given value L1 (see FIG. 6). Actually, the heat generation amount Q is gradually increased as the engine load becomes higher, and thereby the area of the "dQ/dθ" becomes larger as the engine load becomes higher. However, from a viewpoint of focusing the shape of the combustion waveform, FIG. 7 presents combustion waveforms whose areas are approximately equalized by normalizing values of the "dQ/dθ".

First of all, as indicated by a graph G11, considering that combustion noise is less likely to become a problem when the engine load is relatively low, the ECU 10 operates to set, as the self-ignition timing for the CI combustion, a crank angle around top dead center (TDC) of a compression stroke (a relatively advance-side crank angle) capable of attaining stable self-ignition. Further, considering that shorter combustion period provides better fuel economy, the ECU 10 operates to reduce the SI ratio in the SPCCI combustion, i.e., increase the ratio of the CI combustion in the SPCCI combustion. Then, as indicated by a graph G12, in order to suppress the occurrence of combustion noise, the ECU 10 operates to, as the engine load becomes higher, gradually increase the SI ratio (arrowed lines A11, A12), and gradually retard the self-ignition timing for the CI combustion (arrowed line A13) so as to possibly extend a time period during which the CI combustion is performed.

Then, as indicated by a graph G13, when the self-ignition timing reaches a given retard limit $θ_{Lim}$ in the case where the SI ratio is gradually increased and the self-ignition timing is gradually retarded, along with an increase in engine load (arrowed lines A14, A15, A16), the ECU 10 operates to fix the self-ignition timing to the retard limit $θ_{Lim}$ so as to prevent the self-ignition timing from being retarded beyond the retard limit $θ_{Lim}$. This retard limit $θ_{Lim}$ is determined based on a limit value of the self-ignition timing capable of ensuring stability of self-ignition for the CI combustion. The stability of self-ignition for the CI combustion can be ensured by using such a retard limit $θ_{Lim}$ to limit the retardation of the self-ignition timing. Here, the retard limit $θ_{Lim}$ is not limited to a fixed value, but may be a variable to be changed according to any of various states (such as in-cylinder temperature) of the engine 1.

Then, as indicated by a graph G14 (additionally refer to a graph G15 of a broken line indicating only the SI combustion), when the engine load is further increased, the ECU 10 operates to set, as the self-ignition timing, a crank angle at which the heat generation ratio (dQ/dθ) in the SI combustion is approximately maximized, to thereby ensure the stability of self-ignition for the CI combustion. Specifically, the ECU 10 operates to set, as the self-ignition timing, a crank angle corresponding to a peak of heat generation in the SI combustion (at a crank angle position where 50% of fuel has been combusted. Then, when the engine load is further increased, the ECU 10 operates to shift the combustion mode from the second high engine load sub-region (B2) to the first high engine load sub-region (B1) and cause the supercharger 44 to perform supercharging, to thereby suppress the combustion noise. A combustion waveform to be used in the first high engine load sub-region is approximately equal to the graph G14.

Further, in this embodiment, as presented in FIG. 7, the ECU 10 operates to set the SI ratio and the self-ignition timing such that the combustion gravity center of the SPCCI combustion is maintained approximately constant, irrespective of the engine load, so as to reliably satisfy a target engine torque corresponding to a driver's request. When the combustion gravity center of the SPCCI combustion lies around 2 to 6 degree after top dead center (2 to 6 degree ATDC) of a compression stroke, fuel economy is improved. Thus, the ECU 10 operates to set the SI ratio and the self-ignition timing, while taking into account the engine load, such that the combustion gravity center of the SPCCI combustion is maintained, particularly, at such a crank angle position. In this case, the ECU 10 operates to additionally adjust an initial in-cylinder temperature before the start of the SI combustion. Typically, the ECU 10 operates to perform control of gradually arising the initial in-cylinder temperature before the start of the SI combustion as the engine load becomes lower (in other words, perform control of gradually lowering the initial in-cylinder temperature before the start of the SI combustion as the engine load becomes higher). For example, the ECU 10 operates to perform control of increasing an internal EGR ratio to raise the initial in-cylinder temperature before the start of the SI combustion. This makes it possible to delay the start of the SI combustion, i.e., prevent the SI combustion from prematurely starting.

In a situation where the initial in-cylinder temperature before the start of the SI combustion is relatively low, the spark ignition timing for the SI combustion may be advanced so as to gradually increase the SI ratio as the engine load becomes higher. In this case, from a view point of ensuring flame propagation and suppressing cooling loss (i.e., preventing the SI combustion from starting excessively early), the spark ignition timing is preferably set to the advance side within a range which does not exceed a given advance limit.

On the other hand, in a situation where the initial in-cylinder temperature before the start of the SI combustion is relatively high, the SI ratio is preferably increase by possibly lowering the initial in-cylinder temperature as the engine load becomes higher. This is because, when the initial in-cylinder temperature before the start of the SI combustion is relatively high, the in-cylinder temperature quickly reaches a self-ignition temperature after the start of the SI combustion, and thereby the CI combustion is started at a timing earlier than a desired self-ignition timing.

<Relationship Between Initial in-Cylinder Temperature Sand SI Ratio>

Next, control of the SI ratio and the initial in-cylinder temperature, in the control device according to this embodiment, will be described. In this embodiment, the ECU 10 functions as the means/part to control the SI ratio (first control means/part) and the means/part to control the initial in-cylinder temperature (second control means/part), to thereby change respective combustion states of both the SI combustion and the CI combustion in each combustion cycle of the engine 1, according to the operating state of the engine 1. In this way, the ECU 10 operates to attain a desired SPCCI combustion waveform. Specifically, the ECU 10 operates to attain a desired SI ratio and a desired self-ignition timing.

Figure 8:
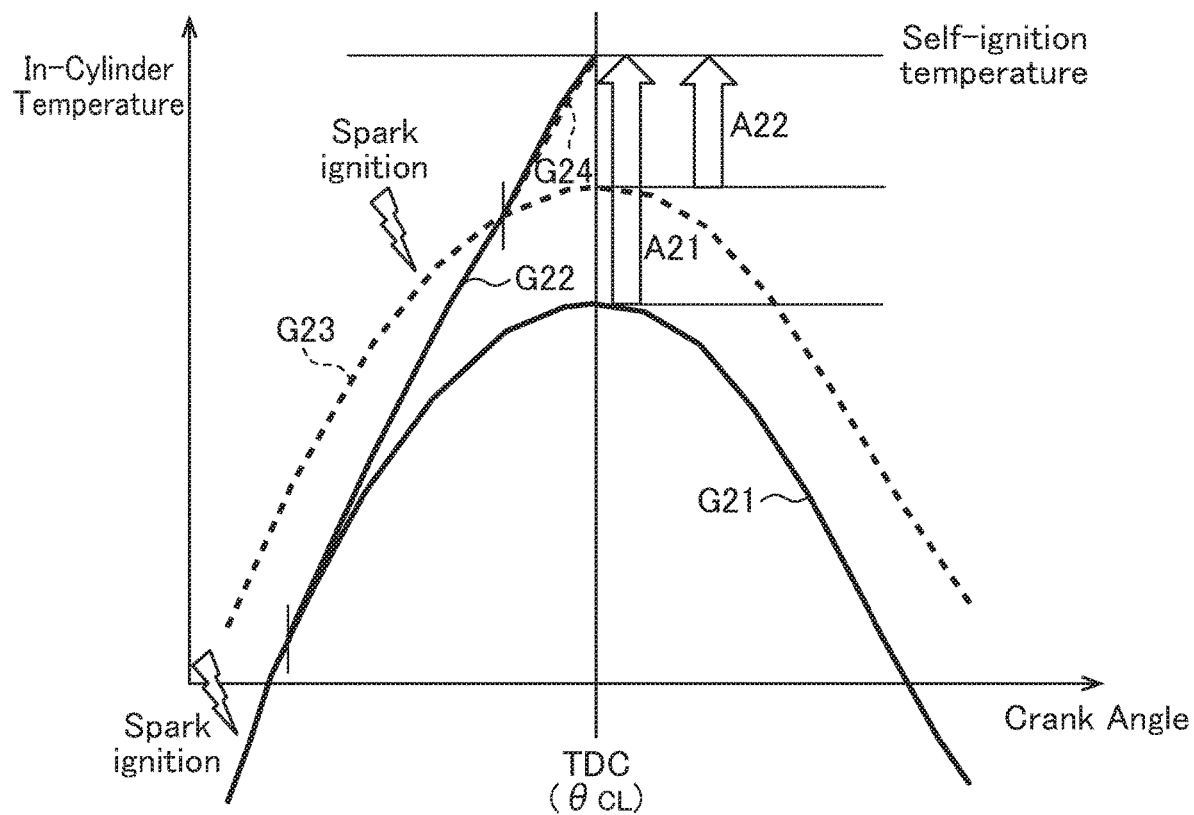
FIG. 8 is an explanatory diagram about a method of controlling the SI ratio according to an initial in-cylinder temperature before the start of combustion, according to this embodiment.
Figure 9:
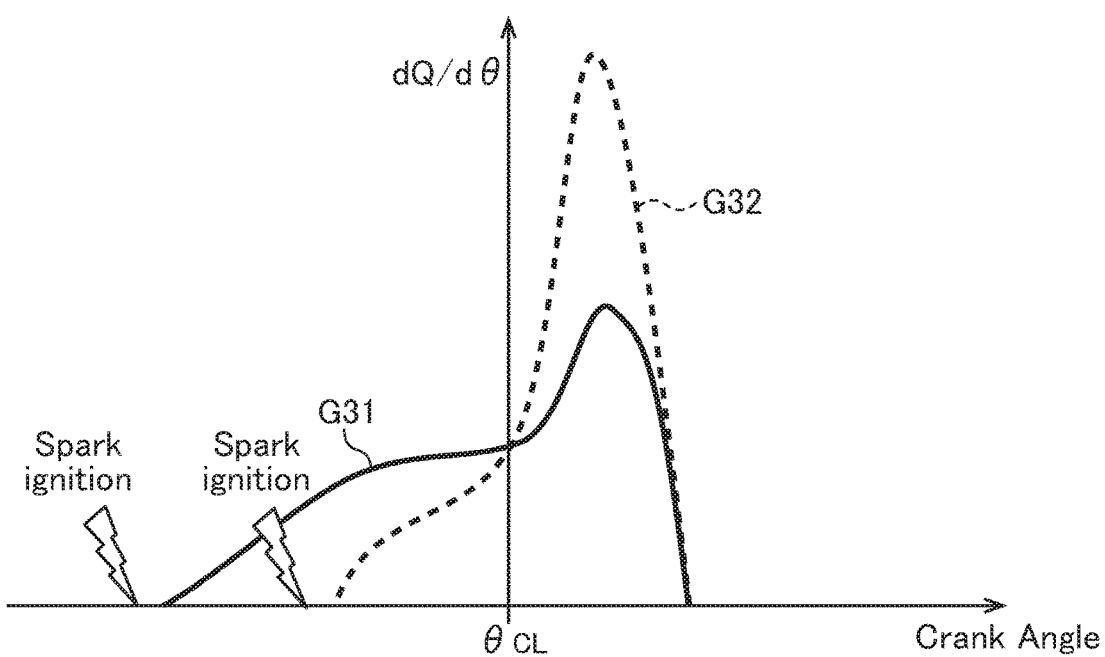
FIG. 9 is an explanatory diagram about a method of controlling the SI ratio according to the initial in-cylinder temperature before the start of combustion, so as to attain a desired self-ignition timing, according to this embodiment.

With reference to FIGS. 8 and 9, control of the SI ratio to be executed according to the initial in-cylinder temperature (initial internal temperature of the combustion chamber 17)

before the start of the SI combustion by the ECU 10 in this embodiment will be specifically described.

FIG. 8 is an explanatory diagram about a method of controlling the SI ratio according to the initial in-cylinder temperature before the start of the SI combustion, in the control device according to this embodiment. FIG. 8 depicts a graph G21 indicating a change in in-cylinder temperature caused by only a movement of the piston 3 (corresponding to during motoring) when the initial in-cylinder temperature before the start of the SI combustion is relatively low, and a graph G23 indicating a change in in-cylinder temperature caused by only the movement of the piston 3 when the initial in-cylinder temperature before the start of the SI combustion is relatively high, wherein the horizontal axis represents crank angle, and the vertical axis represents in-cylinder temperature. Further, FIG. 8 depicts a graph G22 indicating a change in in-cylinder temperature caused by performing the SI combustion so as to induce self-ignition approximately at top dead center (TDC) of a compression stroke when the initial in-cylinder temperature before the start of the SI combustion is relatively low, and a graph G24 indicating a change in in-cylinder temperature caused by performing the SI combustion so as to induce self-ignition approximately at top dead center (TDC) of a compression stroke when the initial in-cylinder temperature before the start of the SI combustion is relatively high.

As seen from the graphs G21 to G24, when the initial in-cylinder temperature before the start of the SI combustion is relatively low, a temperature rise amount (heat generation amount) by the SI combustion, as indicated by the arrowed line A21, is required, and when the initial in-cylinder temperature before the start of the SI combustion is relatively high, a temperature rise amount (heat generation amount) by the SI combustion, as indicated by the arrowed line A22, is required. This shows that when the initial in-cylinder temperature before the start of the SI combustion is relatively low, a relatively large temperature rise amount (heat generation amount) by the SI combustion is required.

Therefore, in this embodiment, the ECU 10 operates to increase the SI ratio when the initial in-cylinder temperature before the start of the SI combustion is relatively low, in a greater amount than when the initial in-cylinder temperature before the start of the SI combustion is relatively high. By controlling the SI ratio according to the initial in-cylinder temperature before the start of the SI combustion in this manner, it becomes possible to attain a target SI ratio and thus attain the target self-ignition timing.

FIG. 9 is an explanatory diagram about a method of controlling the SI ratio according to the initial in-cylinder temperature before the start of the SI combustion, so as to attain a desired self-ignition timing, in the control device according to this embodiment. In FIG. 9, the horizontal axis represents crank angle, and the vertical axis represents heat generation ratio ($dQ/d\theta$). Further, a graph G31 indicates a combustion waveform (in other words, a gear generation pattern) to be set when the initial in-cylinder temperature before the start of the SI combustion is relatively low, and a graph G31 indicates a combustion waveform (in other words, a gear generation pattern) to be set when the initial in-cylinder temperature before the start of the SI combustion is relatively high.

In this embodiment, the ECU 10 operates to control the SI ratio so as to attain a desired self-ignition timing (i.e., a target self-ignition timing) for the CI combustion, irrespective of the initial in-cylinder temperature before the start of the SI combustion.

Specifically, as mentioned above, the ECU 10 operates to gradually increase the SI ratio as the initial in-cylinder temperature before the start of the SI combustion becomes lower (in other words, gradually reduce the SI ratio as the initial in-cylinder temperature before the start of the SI combustion becomes higher). In this case, the ECU 10 operates to gradually increase the SI ratio as the initial in-cylinder temperature before the start of the SI combustion becomes lower, at the same engine load. For example, the ECU 10 operates to control the areas of "$dQ/d\theta$" before reaching the self-ignition timing $\theta_{CI}$, as the SI ratio, i.e., the heat generation amount in the SI combustion, so as to attain the target self-ignition timing. Further, the ECU 10 operates to enable the SI combustion to start earlier, e.g., by advancing the spark ignition timing of the spark plug 25, to thereby increase the SI ratio.

<SPCCI Combustion Control>

Next, details of SPCCI control will be described which is to be executed by the ECU 10 so as to attain a desired SPCCI combustion (specifically, a desired SI ratio, a desired self-ignition timing, etc.) capable of achieving improvement in fuel economy, ensuring of stability of combustion stability, suppression of combustion noise, etc.

(Basic Configuration of Control)

First of all, the outline of the SPCCI combustion control in this embodiment will be described. In this embodiment, the ECU 10 operates to: set a target SI ratio and a target self-ignition timing, according to the operating state of the engine 1; calculate a target in-cylinder temperature before the start of the SPCCI combustion to be set in conformity to the target SI ratio and the target self-ignition timing, specifically, a target initial in-cylinder temperature at a valve closing timing of the intake valve 21 (this timing will hereinafter be denoted by "IVC" on a case-by-case basis); and control the EGR ratio or the like so as to attain the target initial in-cylinder temperature. In this way, control of attaining a desired self-ignition timing, etc., i.e., control for setting a desired in-cylinder state, before the start of the SPCCI combustion, is preliminarily performed. For example, when the target SI ratio is relatively high, a relatively high SI ratio can be attained by setting the target in-cylinder temperature to a relatively low value, as compared to a case where the target SI ratio vale is relatively low. When the target in-cylinder temperature is set to a relatively low value, an internal EGR ratio is controllably reduced, and thereby the initial in-cylinder temperature is lowered. On the other hand, when the target self-ignition timing is relatively advanced, the self-ignition timing can be advanced by setting the target initial in-cylinder temperature to a relatively high value, as compared to a case where the target self-ignition timing is relatively retarded. When the target in-cylinder temperature is set to a relatively high value, the internal EGR ratio is controllably increased, and thereby the initial in-cylinder temperature is raised.

After completion of the above control, the ECU 10 operates to calculate an initial in-cylinder temperature at the IVC timing, from a sensor detection value, and, based on the calculated initial in-cylinder temperature, control the spark ignition timing so as to attain the target self-ignition timing. In this way, control having responsivity greater than that of the control of the internal EGR ratio or the like, i.e., the spark ignition control, is performed just before the SPCCI combustion, to thereby enable the target self-ignition timing to be adequately attained.

Then, after actually performing the SPCCI combustion by the above control, the ECU 10 operates to calculate an initial in-cylinder temperature at the IVC timing before the SPCCI combustion, based on an in-cylinder pressure detected by the in-cylinder pressure sensor SW6 during the SPCCI combustion in the last combustion cycle. Then, the ECU 10 operates to, based on the calculated initial in-cylinder temperature, correct two initial in-cylinder temperatures to be calculated during the SPCCI combustion in the next combustion cycle, specifically, a target initial in-cylinder temperature to be calculated for attaining the target self-ignition timing, and an initial in-cylinder temperature to be subsequently calculated from a sensor detection value. In this way, it becomes possible to improve accuracy in calculation (estimation) of the initial in-cylinder temperature so as to accurately control the SI ratio and the self-ignition timing.

Figure 10:
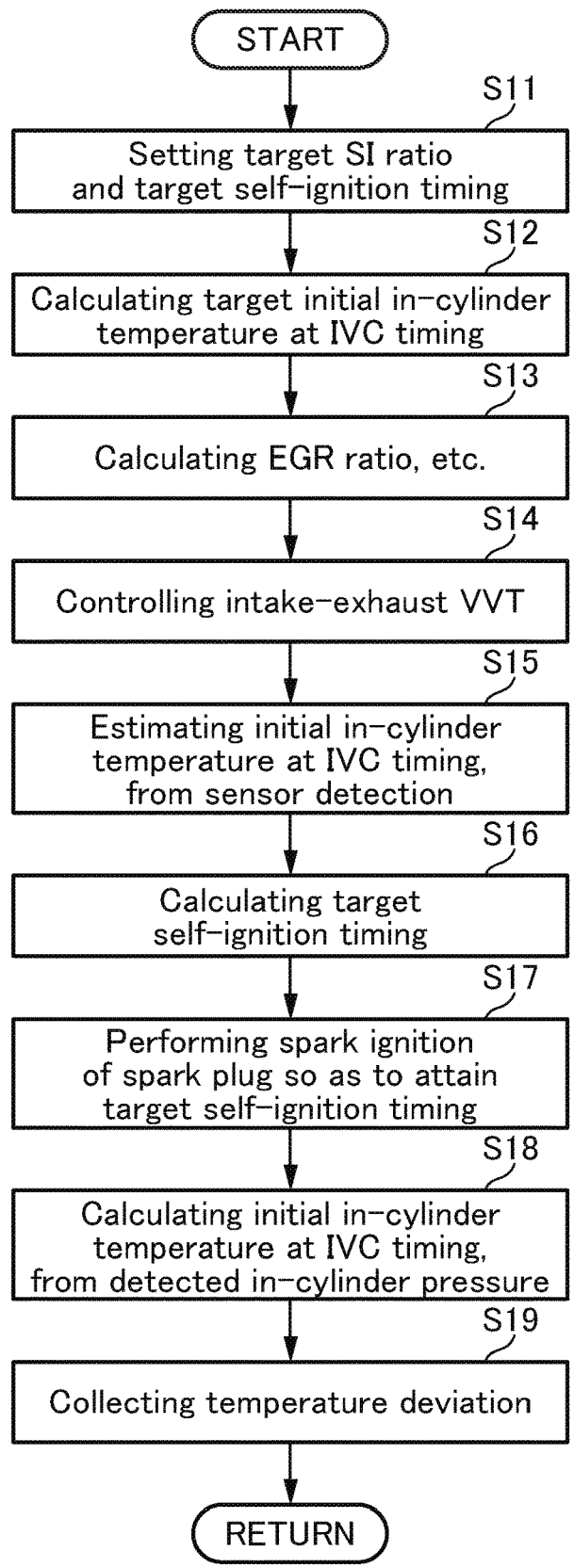
FIG. 10 is a flowchart presenting a basic control for the SPCCI combustion according to this embodiment.
Figure 11:
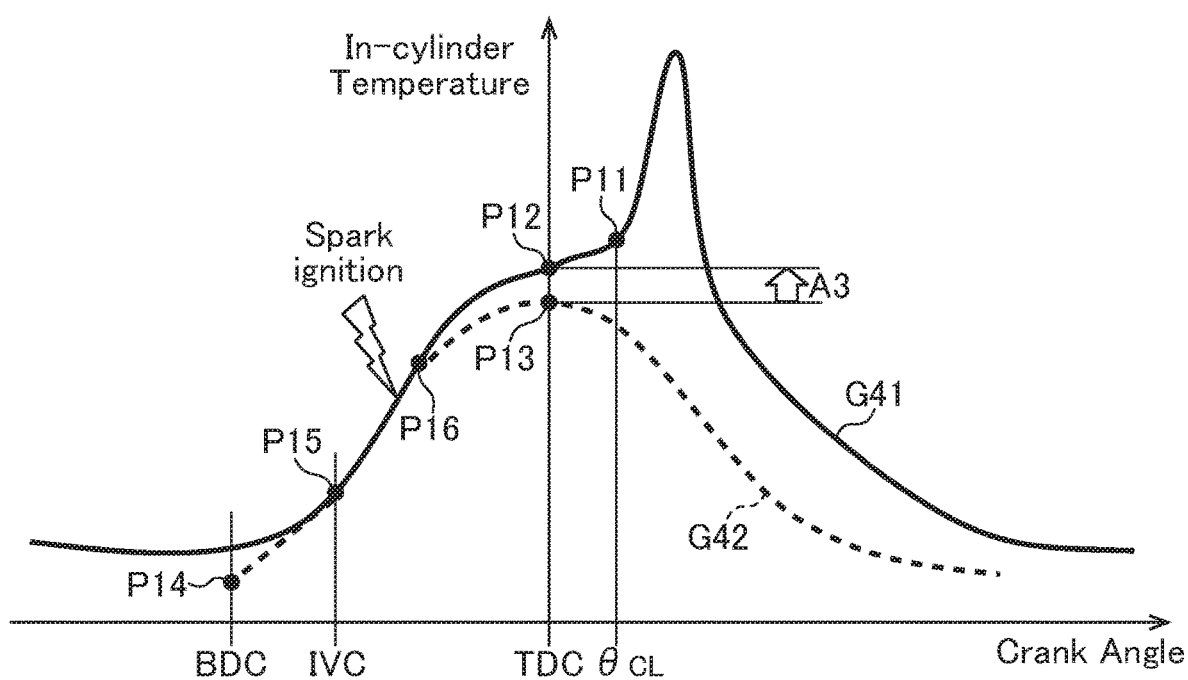
FIG. 11 is an explanatory diagram about a method of estimating the initial in-cylinder temperature before the start of the SI combustion, according to this embodiment.

Next, with reference to FIGS. 10 and 11, a basic configuration of the SPCCI combustion control in this embodiment will be specifically described. FIG. 10 is a flowchart presenting a basic control for the SPCCI combustion to be executed by the control device according to this embodiment, and FIG. 11 is an explanatory diagram about a method of estimating the initial in-cylinder temperature before the start of the SI combustion, in the control device according to this embodiment. The flow depicted in FIG. 10 is repeatedly executed by the ECU 10, in a situation where the engine 1 is in an operating state necessary to perform the SPCCI combustion, typically the engine load is in the intermediate engine load region (B1 or B2).

Upon start of the flow in FIG. 10, first of all, in step S11, the ECU 10 operates to read respective detection signals of the switches SW1 to SW16 to determine the operating state of the engine 1 and set a target SI ratio and a target self-ignition timing. Specifically, the ECU 10 operates to calculate a target engine torque corresponding to an accelerator position detected by the accelerator position sensor SW12, and set a target SI ratio and a target self-ignition timing suited to attain the target engine torque.

Subsequently, in step S12, the ECU 10 operates to calculate a target initial in-cylinder temperature at the IVC timing to be set to attain the target self-ignition timing, using a given combustion model and a given in-cylinder state estimation model. A way to calculate the target initial in-cylinder temperature at the IVC timing will be specifically described with reference to FIG. 11. In the step S12, the ECU 10 also operates to calculate a target air amount, etc., according to the operating state of the engine 1, in addition to the target initial in-cylinder temperature at the IVC timing.

FIG. 11 depicts a graph G41 indicating a change in in-cylinder temperature caused by the SPCCI combustion, and a graph 42 indicating a change in in-cylinder temperature caused by only the movement of the piston 3 (corresponding to during motoring), wherein the horizontal axis represents crank angle, and the vertical axis represents in-cylinder temperature.

First of all, the ECU 10 operates to calculate an in-cylinder temperature (point P12) in a self-ignition region (unburned region) at top dead center (TDC) of a compression stroke, from an in-cylinder temperature (point P11) corresponding to the target self-ignition timing ($\theta_{CL}$) set in the aforementioned manner. Then, the ECU 10 operates to subtract, from the calculated in-cylinder temperature, a temperature rise amount in the self-ignition region due to the SI combustion with respect to the target SI ratio, as indicated by the arrowed line A3, to thereby calculate an in-cylinder temperature at top dead center of a compression stroke during motoring (point P13).

Then, the ECU 10 operates to subtract, from the calculated in-cylinder temperature, a temperature rise amount due to compression of an air-fuel mixture in a polytropic process of the engine 1, to thereby calculate an in-cylinder temperature at a bottom dead center (BDC) of an intake stroke (point P14). Then, the ECU 10 operates to convert the calculated in-cylinder temperature by the polytropic process to thereby calculate an initial in-cylinder temperature at the IVC timing (point P15). In FIG. 11, a point P16 denotes a crank angle and an in-cylinder temperature when the SI combustion is started by spark ignition of the spark plug 25.

Returning to FIG. 10, in step S13, the ECU 10 operates to calculate a level of EGR gas (i.e., EGR ratio), etc., to be introduced in order to attain the target initial in-cylinder temperature at the IVC timing calculated in the step S12, while taking into account a current intake air amount, using the given in-cylinder state estimation model. Typically, the ECU 10 operates to calculate an internal EGR ratio necessary to attain the target initial in-cylinder temperature at the IVC timing.

Subsequently, in step S14, the ECU 10 operates to control various actuators to attain the EGR ratio, etc., calculated in the step S13, using the given in-cylinder state estimation model. Typically, the ECU 10 operates to control respective phase angles of the electric intake VVT device 23 and the electric exhaust VVT device 24 (these will hereinafter be occasionally referred to collectively and simply as "intake-exhaust VVT 23, 24", to introduce internal EGR gas corresponding to an internal EGR ratio for attaining the target initial in-cylinder temperature at the IVC timing. Further, the ECU 10 operates to control the opening degree of the throttle valve 43, the opening degree of the air bypass valve 48, the connection/disconnection of the electromagnetic clutch 45, the opening degree of the EGR valve 54, and others, to attain the target air amount calculated in the step S12. By this control of the ECU 10, an internal state of the combustion chamber 17 is changed to a desired state.

Subsequently, in step S15, the ECU 10 operates to read respective detection signals from the switches SW1 to SW16 to calculate an initial in-cylinder temperature at the IVC timing, using the given in-cylinder state estimation model. Specifically, the ECU 10 operates to acquire an intake air amount detected by the air flow sensor SW1, intake temperatures detected by the first intake temperature sensor SW2 and the second intake temperature sensor SW4, respective rotational angles of the intake camshaft and the exhaust camshaft each detected by a respective one of the intake cam angle sensor SW13 and the exhaust cam angle sensor SW14, and others, and calculate an initial in-cylinder temperature at the IVC timing, based on the acquired information. In this case, the ECU 10 operates to calculate a flow ratio and a temperature of intake gas (fresh air and external EGR gas) to calculate an initial in-cylinder temperature at the IVC timing, using the in-cylinder state estimation model.

In the step S15, the ECU 10 operates to calculates an intake charging amount, an in-cylinder oxygen concentration and the like as the in-cylinder state quantity, in addition to the initial in-cylinder temperature, to determine an fuel injection amount from the injector 6 so as to enable an air/fuel ratio of exhaust gas after combustion to become equal to the theoretical air/fuel ratio (i.e., =1). In this case, when performing the split injection comprising the early-stage injection and the late-stage injection, the ECU 10 operates to determine respective fuel injection amounts for the early-stage injection and the late-stage injection. Basically, fuel injected by the late-stage injection is subjected to the SI combustion, and fuel injected by the early-stage injection is subjected to the CI combustion. Thus, from a viewpoint of controlling the SI ratio, it is preferable to adjust the ratio of the fuel injection amount for the late-stage injection to the fuel injection amount for the early-stage injection (in a case where the air/fuel ratio is set to become leaner, the fuel injection amount for the late-stage injection may be adjusted by itself). Then, the ECU 10 operates to control the injector 6 to inject the determined fuel injection amount. Further, the ECU 10 operates to control the injector 6 to inject fuel at an injection timing based on a preliminarily-set map.

Subsequently, in step S16, the ECU 10 operates to calculate a self-ignition timing for the CI combustion, from the initial in-cylinder temperature at the IVC timing calculated in the step S15, using the given in-cylinder state estimation model. Specifically, the ECU 10 operates to calculate state quantities in an order reverse to that described with reference to FIG. 11, specifically, in the following order: point P15→ point P14→ point P13→ point P12→ point P11, to calculate the self-ignition timing for the CI combustion.

Subsequently, in step S17, the ECU 10 operates to determine a spark ignition timing of the spark plug 25 based on the self-ignition timing calculated in the step S16, using the given combustion mode, so as to enable the target self-ignition timing set in the step S 11 to be attained as accurate as possible. That is, the ECU 10 operates to determine the spark ignition timing of the spark plug 25 for starting the SI combustion, such that the CI combustion is started at a timing possibly close to the target self-ignition timing. Then, the ECU 10 operates to control the spark plug 25 such that the spark ignition is performed at the determined spark ignition timing.

After the step S17, the SPCCI combustion comprising the SI combustion and the CI combustion is performed. After completion of the SPCCI combustion, processing of step S18 is executed. In the step S18, the ECU 10 operates calculate an initial in-cylinder temperature at the IVC before the above SPCCI combustion, based on an in-cylinder pressure detected by the in-cylinder pressure sensor SW6 during the above SPCCI combustion, using the given combustion model and the given in-cylinder state estimation model. That is, the ECU 10 operates to retroactively calculate an initial in-cylinder temperature at the IVC before the SPCCI combustion in the last combustion cycle. Referring to FIG. 11 again, a way to calculate this initial in-cylinder temperature at the IVC timing will be specifically described.

First of all, the ECU 10 operates to calculate a self-ignition timing ($\theta_{CL}$) from an in-cylinder pressure detected by the in-cylinder pressure sensor SW6 (point P11), as depicted in FIG. 11. For example, the ECU 10 operates to calculate, as a self-ignition timing, a crank angle corresponding to an inflection point in a waveform of the detected in-cylinder pressure (which is equivalent to a waveform of the heat generation ratio). Then, the ECU 10 operates to calculate an in-cylinder temperature in a self-ignition region (unburned region) at top dead center (TDC) of a compression stroke (P12), from the target self-ignition timing ($\theta_{CL}$).

Then, the ECU 10 operates to subtract, from the calculated in-cylinder temperature, a temperature rise amount in the self-ignition region due to the SI combustion, as indicated by the arrowed line A3, to thereby calculate an in-cylinder temperature at top dead center of a compression stroke during motoring (point P13). Then, the ECU 10 operates to subtract, from the calculated in-cylinder temperature, a temperature rise amount due to compression of an air-fuel mixture in a polytropic process of the engine 1, to thereby calculate an in-cylinder temperature at a bottom dead center (BDC) of an intake stroke (point P14). Then, the ECU 10 operates to convert the calculated in-cylinder temperature by the polytropic process to thereby calculate an initial in-cylinder temperature at the IVC timing (point P15).

Returning to FIG. 10, in step S19, the ECU 10 operates to correct an initial in-cylinder temperature to be calculated for the SPCCI combustion in the current combustion cycle, based on the initial in-cylinder temperature at the IVC timing during the SPCCI combustion in the last combustion cycle, calculated in the step S18. Specifically, the ECU 10 operates to correct an error in estimation of the initial in-cylinder temperature to be executed by the in-cylinder state estimation model in each of the steps S12 and S15 for the SPCCI combustion in the current combustion cycle. More specifically, the ECU 10 operates to correct the target initial in-cylinder temperature at the IVC timing, calculated to attain the target self-ignition timing (step S12), and the initial in-cylinder temperature at the IVC timing, subsequently calculated from a sensor detection value (step S15), based on the initial in-cylinder temperature calculated in the step S18. In this case, the ECU 10 operates to, instead of correcting each of the initial in-cylinder temperatures calculated in the steps S12 and S15 such that it conforms to the initial in-cylinder temperature calculated in the step S18, perform the correction in the step S19 to correct an error in estimation which is executed by the in-cylinder state estimation model, wherein the estimation error corresponds to an error in the SPCCI combustion control and can be ascertained after actual SPCCI combustion under the control.

(Control Block)

Figure 12:
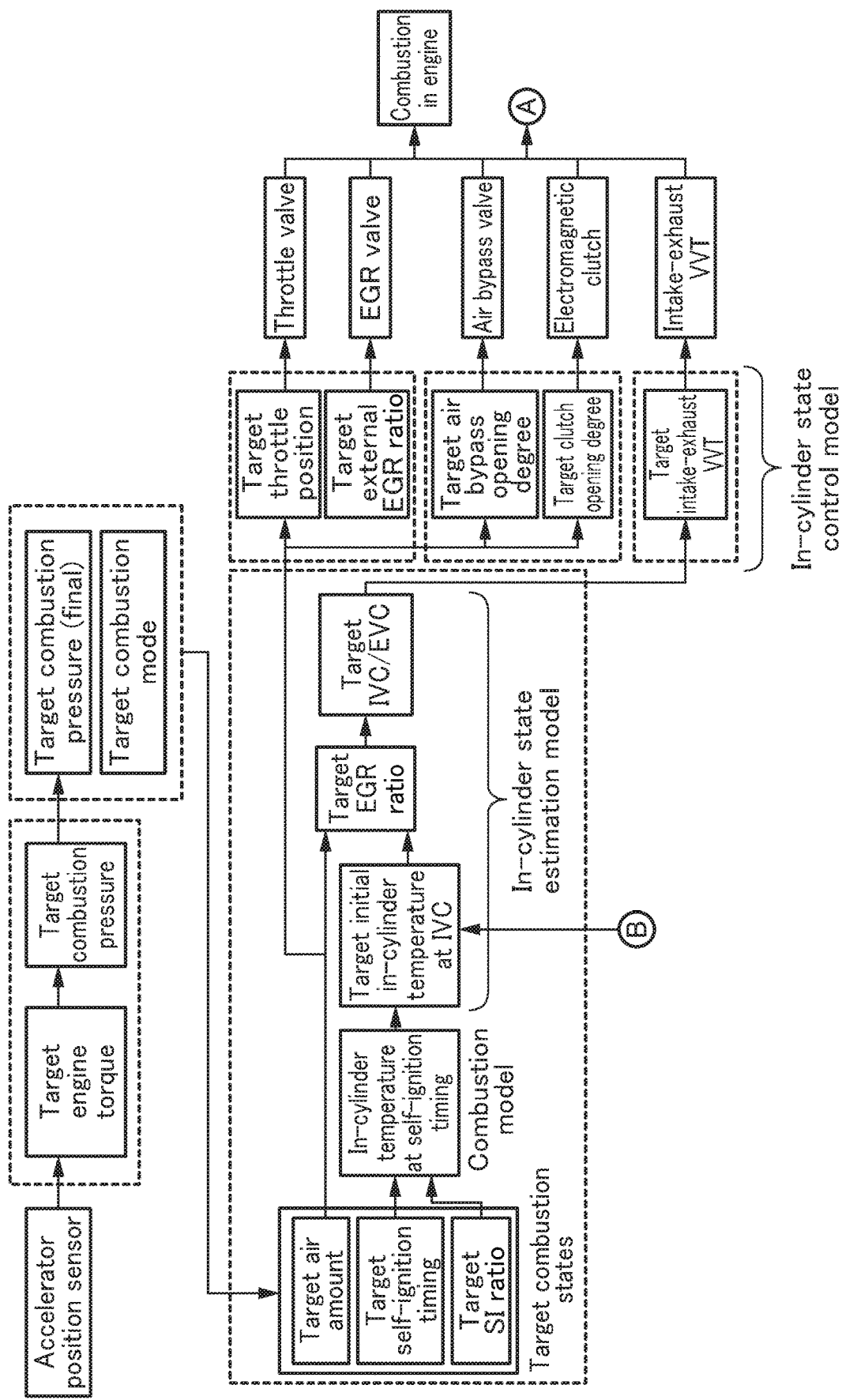
FIG. 12 is a block diagram depicting a first control model of the control device according to this embodiment.
Figure 13:
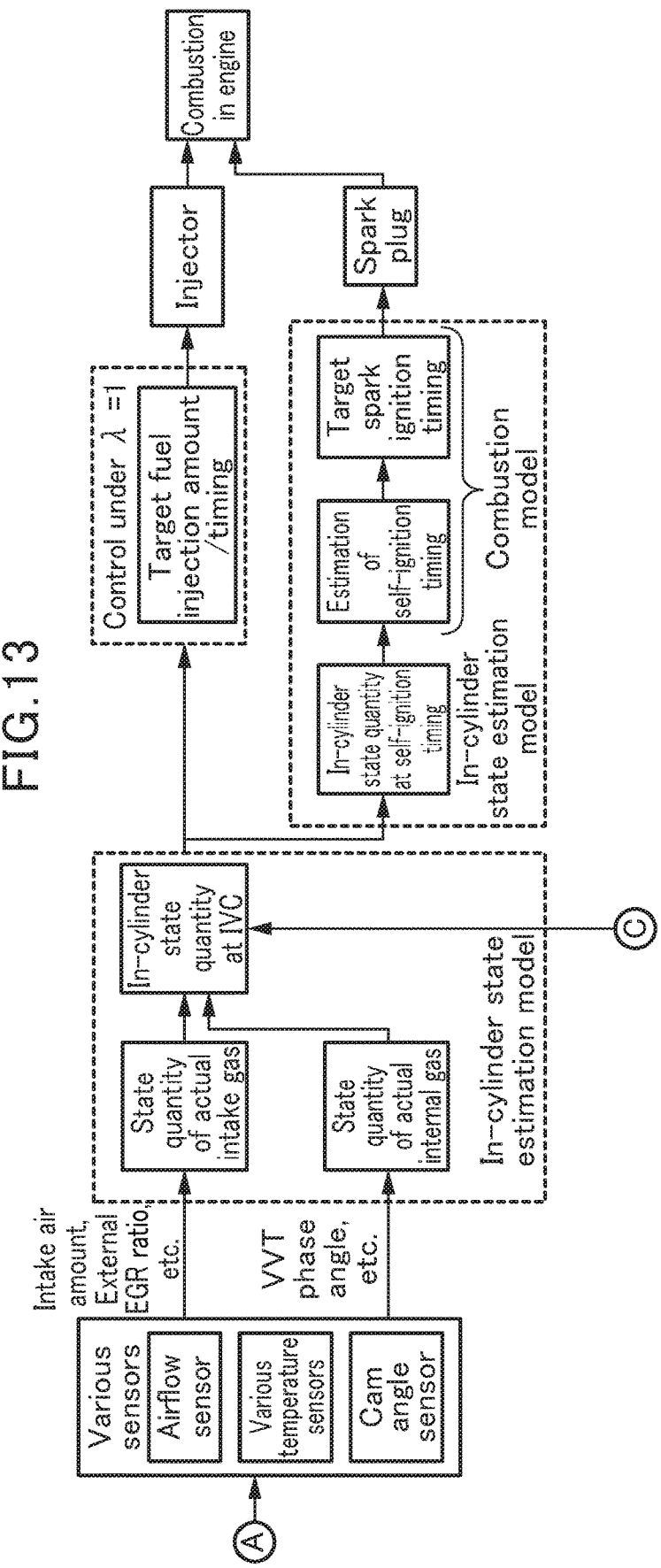
FIG. 13 is a block diagram depicting a second control model of the control device according to this embodiment.
Figure 14:
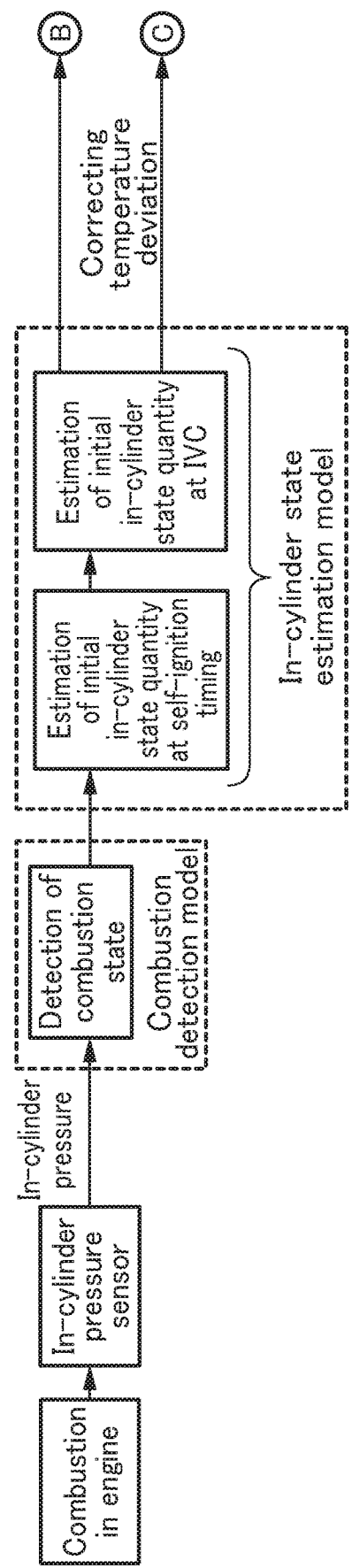
FIG. 14 is a block diagram depicting a third control model of the control device according to this embodiment.

Next, with reference to FIGS. 12 to 14, details of the SPCCI combustion control in this embodiment will be described. FIG. 12 is a block diagram depicting a first control model for preliminarily controlling the in-cylinder state to attain a target self-ignition timing, in this embodiment. FIG. 13 is a block diagram depicting a second control model for, after the control in the first model, performing control with quick responsivity to attain a target self-ignition timing based on a sensor detection value, in this embodiment. FIG. 14 is a block diagram depicting a third control model for estimating an in-cylinder temperature based on an in-cylinder pressure detected during the SPCCI combustion to correct an in-cylinder temperature estimated by the first and second control model during the SPCCI combustion in a subsequent combustion cycle. The ECU 10 is configured to execute controls in the first to third control model.

In the first control model depicted in FIG. 12, first of all, the ECU 10 operates to refer to a preliminarily-set map or the like to calculate a target engine torque corresponding to an accelerator position detected by the accelerator position sensor SW12, and calculate a target combustion pressure corresponding to the target engine torque. Then, the ECU 10 operates to calculate a final target combustion pressure and a target combustion mode, based on the operating state of the engine 1. Basically, this target combustion mode is composed of either a combustion mode in which only the SI combustion is performed or a combustion mode in which the SPCCI combustion comprising the SI combustion and the CI combustion is performed.

Then, the ECU 10 operates to calculate, based on the final target combustion pressure and the target combustion mode, a target air amount, a target self-ignition timing, and a target SI ratio, as a target combustion state. Then, the ECU 10 operates to calculate, using a given combustion model, an in-cylinder temperature at the target self-ignition timing (or calculate an in-cylinder temperature at TDC of a compression stroke) from which a temperature rise amount due to the SI combustion, corresponding to the target SI ratio, is subtracted, and calculate a target initial in-cylinder temperature at the IVC timing, from the calculated in-cylinder temperature, using a given in-cylinder state estimation model. A way to calculate the target initial in-cylinder temperature at the IVC timing is as described in connection with FIGS. 10 and 11, and its description will be omitted here. Further, when calculating the target initial in-cylinder temperature at the IVC timing in the above manner, the ECU 10 operates to correct an error in estimation of the initial in-cylinder temperature by the in-cylinder state estimation model, based on an initial in-cylinder temperature estimated during the SPCCI combustion in the last combustion cycle by the third control model (see FIG. 14).

Then, the ECU 10 operates to refer to a preliminarily-set map or the like to calculate, based on the target air amount and the target initial in-cylinder temperature at the IVC timing, a target EGR ratio indicative of a level of exhaust recirculation to be introduced into the combustion chamber 17, particularly, a target internal EGR ratio. Then, the ECU 10 operates to calculate a target valve closing timing of the intake valve 21 (target IVC timing) and a target valve closing timing of the exhaust valve 22 (target EVC timing). Then, the ECU 10 operates to determine, using a given in-cylinder state control model, respective target phase angles of the intake-exhaust VVT 23, 24 corresponding, respectively, to the target IVC timing and target EVC timing, and control the intake-exhaust VVT 23, 24 such that they are set, respectively, at the target phase angles.

Approximately in concurrence with the above control of the intake-exhaust VVT 23, 24, the ECU 10 operates to determine, using the given in-cylinder state control model, a target throttle position, a target external EGR ratio, a target air bypass opening degree, and a target clutch opening degree (corresponding to disconnection/connection of the electromagnetic clutch 45). Then, the ECU 10 operates to perform control of the throttle valve 43 according to the target throttle position, control of the EGR valve 54 according to the target external EGR ratio, control of the air bypass valve 48 according to the target air bypass opening degree, and control of the electromagnetic clutch 45 according to the target clutch opening degree. After this operation, the SPCCI combustion is performed in the engine 1.

Next, in the second control model depicted in FIG. 13, first of all, the ECU 10 operates to acquire an intake air amount detected by the airflow sensor SW1, intake temperatures detected by the first intake temperature sensor SW2 and the second intake temperature sensor SW4, respective rotational angles of the intake camshaft and the exhaust camshaft each detected by the intake cam angle sensor SW13 and the exhaust cam angle sensor SW14, and others. Then, the ECU 10 operates to calculate a state quantity (typically, temperature and/or pressure) of actual intake gas (fresh air), based on the intake air amount, the external EGR ratio and others corresponding to the above sensor detection values. In addition, the ECU 10 operates to calculate a state quantity (typically, temperature and/or pressure) of actual internal EGR gas, based on respective phase angle (basically, advance-side phase angles) of the intake-exhaust VVT 23, 24 each corresponding to a respective one of the rotational angles of the intake camshaft and the exhaust camshaft.

Then, the ECU 10 operates to calculate an actual initial in-cylinder temperature at the IVC timing, from the state quantity of intake gas and the state quantity of internal EGR gas, using the given in-cylinder state estimation model. In this case, the ECU 10 operates to calculate an initial in-cylinder temperature at the IVC timing, after correcting an estimation error in the in-cylinder state estimation model, based on the initial in-cylinder temperature during the SPCCI combustion in the last combustion cycle, estimated by the third control model (see FIG. 14). The ECU 10 operates to calculate, as the in-cylinder state quantities, an intake charging amount, an in-cylinder oxygen concentration, etc., in addition to the initial in-cylinder temperature.

Then, the ECU 10 operates to determine an fuel injection amount from the injector 6 so as to enable an air/fuel ratio of exhaust gas after combustion to become equal to the theoretical air/fuel ratio (i.e., $\lambda=1$). In this case, when performing the split injection comprising the early-stage injection and the late-stage injection, the ECU 10 operates to determine respective fuel injection amounts for the early-stage injection and the late-stage injection. Then, the ECU 10 operates to control the injector 6 to inject the determined fuel injection amount. Further, the ECU 10 operates to control the injector 6 to inject fuel at an injection timing based on a preliminarily-set map.

Approximately in concurrence with the above control of the injector 6, the ECU 10 operated to calculate an in-cylinder temperature to be generated when self-ignition occurs, from the calculated initial in-cylinder temperature at the IVC timing, and calculate a self-ignition timing of the self-ignition. A way to calculate the self-ignition timing is as described in connection with FIGS. 10 and 11, and its description will be omitted here. Then, the ECU 10 operates to determine a target spark ignition timing of the spark plug 25 so as to attain the initially-set target self-ignition timing, based on the calculated self-ignition timing, using the given combustion model. Further, the ECU 10 operates to control the spark plug 25 to perform spark ignition at the determined target spark ignition timing. After this operation, the SPCCI combustion is performed in the engine 1.

The present invention is not limited to performing the second control model after the first control model. For example, the second control model may be performed substantially in concurrency with the first control model. Similarly, in the flow of FIG. 10, the processings in the steps S15 to S17 corresponding to the second control model may be performed substantially in concurrency with the processings in the steps S11 to S14 corresponding to the first control model. In one example, the ECU 10 is operable, in a period before reaching a crank angle corresponding to the IVC timing, to calculate a target initial in-cylinder temperature at the IVC timing, using the first control model, and repeatedly control the internal EGR ratio, etc., so as to attain the target initial in-cylinder temperature, and, during this control, to repeatedly perform processing of calculating an initial in-cylinder temperature at the IVC timing based on a sensor detection value and calculating a spark ignition timing for attaining a target self-ignition timing, using the second control model. Then, in this example, the ECU 10 is operable, after reaching the crank angle corresponding to the IVC timing, to stop the execution of the first control model, and perform spark ignition control using a spark ignition timing calculated from an initial in-cylinder temperature corresponding to a sensor detection value when reaching the IVC timing.

Next, in the third control model depicted in FIG. 14, first of all, the ECU 10 operates to, after competition of the SPCCI combustion in one combustion cycle of the engine 1, acquire an in-cylinder pressure detected by the in-cylinder pressure sensor SW6 during the SPCCI combustion in this combustion cycle. Then, the ECU 10 operates to calculate a combustion state of the SPCCI combustion, using a given combustion detection model. For example, the ECU 10 operates to obtain an inflection point or the like in a waveform of the acquired in-cylinder pressure (which is equivalent to a waveform of the heat generation ratio), as a combustion state.

Then, the ECU 10 operates to calculate an in-cylinder temperature at a self-ignition timing, from the combustion state of the SPCCI combustion, using the given in-cylinder state estimation model, and, from the calculated in-cylinder temperature, calculate an initial in-cylinder temperature at the IVC timing. A way to calculate the initial in-cylinder temperature at the IVC timing is as described in connection with FIGS. 10 and 11, and its description will be omitted here. Then, the ECU 10 operates to correct, based on the calculated initial in-cylinder temperature at the IVC timing, each initial in-cylinder temperature to be calculated during the SPCCI combustion in the current combustion cycle. That is, the ECU 10 operates to correct an error in estimation which is executed by the in-cylinder state estimation model during the SPCCI combustion in the current combustion cycle. Specifically, the ECU 10 operates to correct an initial in-cylinder temperature at the IVC timing to be calculated to attain the target self-ignition timing in the first control model (see FIG. 12), and an initial in-cylinder temperature at the IVC timing to be calculated from a sensor detection value in the second control model (see FIG. 13). Basically, the above correction is performed on the assumption that an initial in-cylinder temperature obtained by the third control model is used as an actual value (reference value), and an initial in-cylinder temperature to be obtained from each of the first and second control model is handled as an estimate value including an error with respect to the initial in-cylinder temperature as the actual value.

(Time Chart)

Next, with reference to FIG. 15, a time chart obtained when the SPCCI combustion control in this embodiment is performed will be described.

Figure 15:
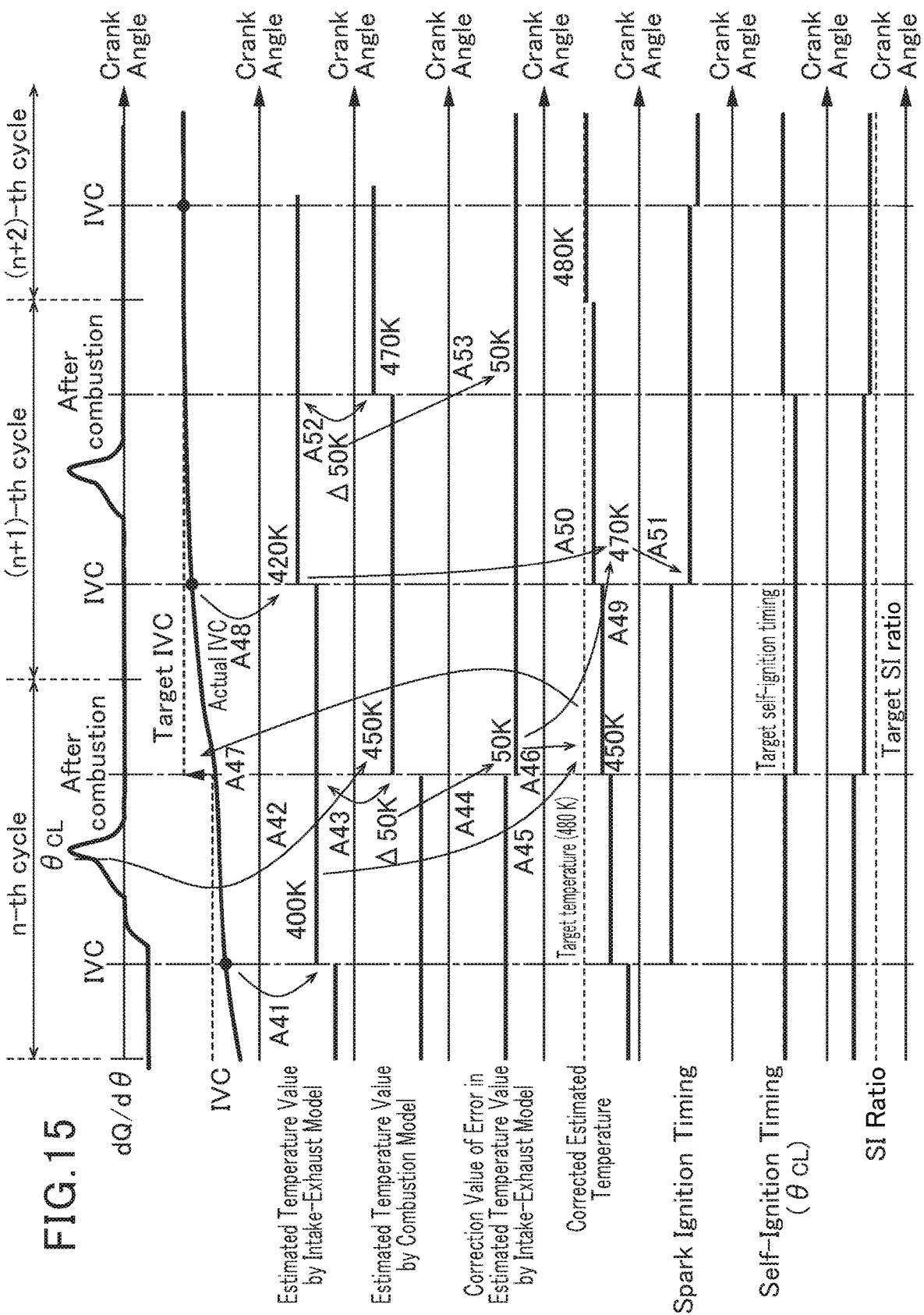
FIG. 15 is a time chart in a case where SPCCI combustion control is executed according to this embodiment.

FIG. 15 presents: heat generation ratio (dQ/dθ); valve closing timing of the intake valve (actual IVC timing and target IVC timing); initial in-cylinder temperature at the IVC timing estimated in the second control model (hereinafter referred to appropriately as "estimated temperature value by the intake-exhaust model"); initial in-cylinder temperature at the IVC timing estimated in the third control model (hereinafter referred to appropriately as "estimated temperature value by the combustion model"); correction value of an error in the estimated temperature value by the intake-exhaust model with respect to the estimated temperature value by the combustion model; corrected estimated temperature; spark ignition timing; self-ignition timing; and SI ratio, in this order from the top. In FIG. 15, the horizontal axis represents crank angle, and changes in various parameters with respect to crank angle are presented. Although only the valve closing timing of the intake valve 21 (IVC) is presented in FIG. 15, the valve closing timing of the exhaust valve 22 (EVC) changes in the same manner.

FIG. 15 shows one example in which, just after the start of the n-th cycle, an error (true value) of the estimated temperature value by the intake-exhaust model with respect to the estimated temperature value by the combustion model is changed by about 50 [K] due to disturbance. First of all, the ECU 10 operates to estimate an initial in-cylinder temperature at the IVC timing using the second control model, to obtain 400 [K] as the estimated temperature value by the intake-exhaust model (arrowed line A41). Then, the SPCCI combustion is performed in the engine 1. After this combustion, the ECU 10 operates to estimate an initial in-cylinder temperature at the IVC timing, from an in-cylinder temperature at the self-ignition timing $\theta_{CL}$ in the SPCCI combustion in the n-th cycle, based on an in-cylinder pressure detected by the in-cylinder pressure sensor SW6, using the third control model (arrowed line A42), to obtain 450 [K] as the estimated temperature value by the combustion model. In this case, an error of the estimated temperature value by the intake-exhaust model with respect to the estimated temperature value by the combustion model is Δ50 [K] (arrowed line A43). Thus, the ECU 10 operates to set a correction amount for the error of the estimated temperature value by the intake-exhaust model with respect to the estimated temperature value by the combustion model, to 50 [K] (arrowed line A44), and correct the estimated temperature value by the intake-exhaust model to 450 [K] by this correction amount (arrowed lines A45 and A46). This estimated temperature deviates from a target temperature of 480 [K]. Thus, in the n-th cycle, the estimated temperature value by the intake-exhaust model after the error correction deviates from the target temperature, so that the self-ignition timing deviates from a target self-ignition timing, and the SI ratio deviates from a target SI ratio.

Then, the ECU 10 operates to correct the target IVC timing of the intake valve 21 using the first control model so as to enable the corrected estimated temperature to become 480 [K]. In this way, the error in the temperature estimation (variation) in the n-th cycle can be reflected. Then, the ECU 10 operates to estimate an initial in-cylinder temperature at the IVC timing, using the second control model to obtain 420 [K] as the estimated temperature value by the intake-exhaust model (arrowed line A48), and correct this value 420 [K] to 470 [K] by the above correction value 50 [K] (arrowed lines A49 and A50). Further, the ECU 10 operates to correct the spark ignition timing based on this corrected estimated temperature 470 [K] (arrowed line A51). In this way, both the intake state in the current (n+1)-th cycle and the result of combustion in the last n-th cycle can be reflected on the spark ignition timing.

Then, the SPCCI combustion is performed in the engine 1. After this combustion, the ECU 10 operates to estimate an initial in-cylinder temperature at the IVC timing, from an in-cylinder temperature at the self-ignition timing $\theta_{CL}$ in the SPCCI combustion in the (n+1)-th cycle, based on an in-cylinder pressure detected by the in-cylinder pressure sensor SW6, using the third control model, to obtain 470 [K] as the estimated temperature value by the combustion model. In this case, the deviation in the estimation by the intake-exhaust model is not largely changed, and thereby an error in estimated temperature value is still Δ50 [K] (arrowed line A52). In view of the above, in the current (n+1)-th cycle, the temperature estimation can be considered to be properly performed (arrowed line A53). Thus, in the current (n+1)-th cycle, the self-ignition timing will be approximately coincident with the target self-ignition timing. On the other hand, in the current (n+1)-th cycle, the actual IVC timing of the intake valve 21 still deviates from the target IVC timing, so that the SI ratio still slightly deviates from the target SI ratio. Subsequently, in the (n+2)-th cycle, the error in the estimated temperature by the intake-exhaust model is properly corrected, and thereby the corrected estimated temperature is coincident with the target temperature 480 [K]. Thus, the actual IVC timing of the intake valve 21 will reach the target IVC timing, and the SI ratio will be approximately coincident with the target SI ratio.

The deviation in the estimated temperature value by the intake-exhaust model after the error correction is likely to occur due to delay in operation of a device for adjusting the in-cylinder state (e.g., the intake-exhaust VVT 23, 24 for adjusting the internal EGR), or a situation where such a device is not operated as intended.

<Functions/Effects>

Next, major functions/advantageous effects of the compression self-ignition engine control device according to the above embodiment will be described.

In the above embodiment, based on the operating state (engine load, etc.) of the engine 1, control of adjusting the SI ratio and control of adjusting the self-ignition timing and/or the initial in-cylinder temperature are performed to control a combustion state of the SPCCI combustion comprising the SI combustion and the CI combustion. This makes it possible to adequately attain a desired SPCCI combustion. Specifically, the SI ratio and the self-ignition timing in the SPCCI combustion can be set, respectively, to their target values. As a result, it becomes possible to achieve improvement in fuel economy, ensuring of combustion stability, and suppression of combustion noise.

In the above embodiment, before the start of the SPCCI combustion, control of adjusting the in-cylinder temperature (control of internal EGR gas) is performed. Then, after this control, an actual initial in-cylinder temperature before the SI combustion is calculated, and the spark ignition timing is controlled based on the calculated initial in-cylinder temperature to adjust the SI ratio. This makes it possible to adequately control the SI ratio while taking into account a control deviation in each of various state quantity setting devices.

In the above embodiment, various control values for adjusting the SI value in the current combustion cycle are corrected based on an initial in-cylinder temperature acquired in the least combustion cycle. This makes it possible to effectively attain a target SI ratio in the SPCCI combustion, and reliably induce self-ignition at a target self-ignition timing. Specifically, it becomes possible to adequately attain a desired combustion state, in both a transient state and a steady state in the SPCCI combustion.

<Modifications>

Some modifications of the above embodiment will be described below.

In the above embodiment, an in-cylinder temperature at the valve closing timing of the intake valve 21 (IVC timing) is used as the initial in-cylinder temperature. Alternatively, various controls may be performed using an in-cylinder temperature at bottom dead center (BDC) of an intake stroke.

In the above embodiment, the second control model is configured to calculate an initial in-cylinder temperature, from the intake air amount detected by the airflow sensor SW1. Alternatively, the second control model may be configured to calculate an initial in-cylinder temperature, from the in-cylinder pressure detected by the in-cylinder pressure sensor SW6. Further, the third control model is configured to calculate an initial in-cylinder temperature, from the in-cylinder pressure detected by the in-cylinder pressure sensor SW6. Alternatively, the second control model may be configured to calculate an initial in-cylinder temperature, from the intake air amount detected by the airflow sensor SW1.

In the above embodiment, a swirl control valve may be provided in the intake passage to generate a swirl flow in the combustion chamber. In this case, the intake passage may comprise a primary passage leading to the first intake port and a secondary passage leading to the second intake port, and the swirl control valve may be provided in the secondary passage and configured to be closed to narrow the secondary passage such that a flow passage area thereof becomes less than that of the primary passage so as to form the swirl flow. By forming a swirl flow during the SPCCI combustion, it becomes possible to enhance flow in the cylinder so as to provide a steep SI combustion to further enhance controllability of the self-ignition timing. Further, by enhancing flow by the swirl control valve, it becomes possible to expand the SPCCI region to a zone close to a maximum engine load.

In the above embodiment, the SPCCI combustion is performed using a G/F lean mixture having an excess air ratio $\lambda$ of 1.0±0.2 and a G/F of 18.5 to 30 in an engine operating range from the low engine load region to the intermediate engine load region. Alternatively, in the low engine load region, the SPCCI combustion may be performed using a A/F lean mixture having an average in-cylinder A/F of 30 or more. In this case, the A/F of the SI combustion air-fuel mixture around the spark plug may be set to less than 25, and the A/F of the CI combustion air-fuel mixture around the SI combustion air-fuel mixture may be set to 35 or more. In this case, it becomes possible to provide a steep SI combustion to ensure controllability of the self-ignition timing, and suppress NOx emission level. Even in the SPCCI combustion using an A/F lean mixture, combustion noise is relatively small, because, in the low engine speed region, the in-cylinder temperature is relatively low. Thus, the A/F lean mixture makes it possible to further improve fuel economy.

In the above embodiment, the split injection is performed in a compression stroke. Alternatively, the split injection may be performed in an intake stroke, and a compression stroke, specifically a late phase of a compression stroke. In this case, by performing a first injection in an intake stroke, it becomes possible to distribute fuel over the combustion chamber approximately homogenously. Further, by performing a second injection in a compression stroke, it becomes possible to lower an internal temperature of the combustion chamber by latent heat of vaporization of the fuel. Thus, it becomes possible to prevent an air-fuel mixture containing the fuel injected in the first injection from being prematurely self-ignited.

LIST OF REFERENCE SIGNS

1 engine
6 injector
10 ECU (controller)
17 combustion chamber
23 electric intake VVT device (state quantity setting device, variable valve timing device)
24 electric exhaust VVT device (state quantity setting device, variable valve timing device)
25 spark plug
43 throttle valve (state quantity setting device)
44 supercharger
48 air bypass valve (state quantity setting device)
49 supercharging system (state quantity setting device)
54 EGR valve (state quantity setting device)
55 EGR system (state quantity setting device)

The invention claimed is:

1. A control device for a compression self-ignition engine having a combustion chamber operable to combust an air-fuel mixture, an injector operable to inject fuel to supply the fuel into the combustion chamber, and a spark plug operable to ignite the air-fuel mixture in the combustion chamber, the compression self-ignition engine configured to cause the air-fuel mixture in the combustion chamber to combust by a self-ignition in association with a spark ignition of the spark plug, the control device comprising:
a controller configured to control at least the injector and the spark plug to control an operation of the engine; and
a state quantity setting device configured to adjust an introduction of fresh air and burned gas into the combustion chamber of the engine so as to thereby set an inside of the combustion chamber to a desired state, the state quantity setting device selected from the group consisting of an EGR valve, an EGR system, a throttle valve, an air bypass valve, a supercharger, an intake variable valve timing device, and an exhaust variable valve timing device,
wherein the engine performs a first combustion in which the air-fuel mixture is combusted due to a flame propagation triggered by the spark ignition of the spark plug, and a second combustion in which the air-fuel mixture is combusted due to the self-ignition induced by the flame propagation,
wherein the controller comprises a processor configured to:
control a spark ignition (SI) ratio which is a ratio of a heat amount generated in the first combustion with respect to a total heat amount generated in the first and second combustions or a heat amount generated in the second combustion, based on an operating state of the engine and during each combustion cycle of the engine; and
control an initial in-cylinder temperature which is an internal temperature of the combustion chamber before a start of the first combustion, based on the operating state of the engine and during each combustion cycle of the engine,
wherein the controller is configured to change combustion states of both the first and second combustions by controlling both the SI ratio and the initial in-cylinder temperature according to the operating state of the engine, during each combustion cycle of the engine,
wherein the controller is configured to set a target SI ratio and a target initial in-cylinder temperature before the start of the first combustion each according to the operating state of the engine, and to perform control of adjusting the SI ratio and control of adjusting the initial in-cylinder temperature, so as to attain the target SI ratio and the target initial in-cylinder temperature, and
wherein the controller is configure d to:
control the state quantity setting device such that a ratio between fresh air and burned gas to be introduced into the combustion chamber is adjusted so as to attain the target initial in-cylinder temperature;
estimate an actual initial in-cylinder temperature before the start of the first combustion; and
adjust a spark ignition timing of the spark plug as a function of the actual initial in-cylinder temperature, to thereby attain a self-ignition timing according to the target SI ratio and the target initial in-cylinder temperature.

2. The control device according to claim 1, wherein the controller is configured to perform control of gradually lowering the initial in-cylinder temperature as an engine load serving as the operating state of the engine becomes higher.

3. The control device according to claim 1, wherein the controller is configured to control the SI ratio and the initial in-cylinder temperature such that a combustion gravity center position in a combustion corresponding to a combination of the first and second combustions is maintained constant, irrespective of an engine load serving as the operating state of the engine.

4. The control device according to claim 1,
wherein the controller is configured to control the state quantity setting device such that the ratio between fresh air and burned gas to be introduced into the combustion chamber is adjusted so as to adjust the initial in-cylinder temperature.

5. The control device according to claim 1, wherein the controller is configured to adjust, as the initial in-cylinder temperature before the start of the first combustion, an in-cylinder temperature at a timing when a piston of the engine is located at a bottom dead center position in an intake stroke.

6. The control device according to claim 1, wherein the controller is configured to perform control of gradually increasing the SI ratio, as an engine load serving as the operating state of the engine becomes higher.

7. The control device according to claim 1, wherein the controller is configured to control the spark ignition timing of the spark plug to adjust the SI ratio.

8. The control device according to claim 1,
wherein the controller is configured to control the state quantity setting device such that the ratio between fresh air and burned gas to be introduced into the combustion chamber is adjusted so as to adjust the SI ratio.

9. The control device according to claim 1,
wherein the controller is configured to control the injector to execute a late-stage injection for injecting fuel at a timing before and close to the spark ignition timing of the spark plug, and an early-stage injection for injecting fuel at a timing before the late-stage injection and apart from the spark ignition timing, so as to form a homogeneous air-fuel mixture in the combustion chamber, and
wherein the controller is configured to control a fuel injection amount from the injector in the late-stage injection, so as to adjust the SI ratio.

10. A control device for a compression self-ignition engine having a combustion chamber operable to combust an air-fuel mixture, an injector operable to inject fuel to supply the fuel into the combustion chamber, and a spark plug operable to ignite the air-fuel mixture in the combustion chamber, the compression self-ignition engine configured to cause the air-fuel mixture in the combustion chamber to combust by a self-ignition in association with a spark ignition of the spark plug, the control de vice comprising:
a controller configured to control at least the injector and the spark plug to control an operation of the engine; and
a state quantity setting device configured to adjust an introduction of fresh air and burned gas into the combustion chamber of the engine so as to thereby set an inside of the combustion chamber to a desired state, the state quantity setting device selected from the group consisting of an EGR valve, an EGR system, a throttle valve, an air bypass valve, a supercharger, an intake variable valve timing device, and an exhaust variable valve timing device,
wherein the engine performs a first combustion in which the air-fuel mixture is combusted due to a flame propagation triggered by the spark ignition of the spark plug, and a second combustion in which the air-fuel mixture is combusted due to the self-ignition induced by the flame propagation,
wherein the controller comprises a processor configured to:

control a spark ignition (SI) ratio which is a ratio of a heat amount generated in the first combustion with respect to a total heat amount generated in the first and second combustions or a heat amount generated in the second combustion, based on an operating state of the engine and during each combustion cycle of the engine; and adjust a self-ignition timing which is a timing at which the self-ignition occurs, as a function of the operating state of the engine and during each combustion cycle of the engine, wherein the controller is configured to change combustion states of both the first and second combustions by controlling both the SI ratio and an initial in-cylinder temperature according to the operating state of the engine, during each combustion cycle of the engine, wherein the controller is configured to set a target SI ratio and a target initial in-cylinder temperature before a start of the first combustion each according to the operating state of the engine, and to perform control of adjusting the SI ratio and control of adjusting the initial in-cylinder temperature, so as to attain the target SI ratio and the target initial in-cylinder temperature, and where in the controller is configured to:
control the state quantity setting device such that a ratio between fresh air and burned gas to be introduced into the combustion chamber is adjusted so as to attain the target initial in-cylinder temperature;

estimate an actual initial in-cylinder to before the start of the first combustion; and adjust a spark ignition timing of the spark plug as a function of the actual initial in-cylinder temperature, to thereby attain the self-ignition timing according to the target SI ratio and the target initial in-cylinder temperature.

11. The control device according to claim 10, wherein the controller is configured to perform control of gradually shifting the self-ignition timing toward a retard side, as an engine load serving as the operating state of the engine becomes higher.

12. The control device according to claim 11, wherein the controller is configured to shift the self-ignition timing toward the retard side to the extent that the self-ignition timing does not exceed a given retard limit.

13. The control device according to claim 10, wherein the controller is configured to control the SI ratio and the self-ignition timing such that a combustion gravity center position in a combustion corresponding to a combination of the first and second combustions is maintained constant, irrespective of an engine load serving as the operating state of the engine.

14. The control device according to claim 10, wherein the controller is configured to control the spark ignition timing of the spark plug to adjust the self-ignition timing.

15. The control device according to claim 10, wherein the controller is configured to set the target SI ratio and a target self-ignition timing each according to the operating state of the engine, and to perform control of adjusting the SI ratio and the self-ignition timing, so as to attain the target SI ratio and the target self-ignition timing.

16. The control device according to claim 15,
wherein the controller is configured to calculate a state of the inside of the combustion chamber before the start of the first combustion to be set according to the target SI ratio and the target self-ignition timing, and to control the state quantity setting device such that the ratio between fresh air and burned gas to be introduced into the combustion chamber is adjusted so as to attain the calculated state, and to acquire an actual state of the inside of the combustion chamber before the start of the first combustion so as to adjust the spark ignition timing of the spark plug as a function of the actual state, to thereby attain the target self-ignition timing.

* * * * *